(12) United States Patent
Mariaux et al.

(10) Patent No.: US 11,932,925 B2
(45) Date of Patent: Mar. 19, 2024

(54) ALUMINUM ALLOYS AND COATED ALUMINUM ALLOYS WITH HIGH CORROSION RESISTANCE AND METHODS OF MAKING THE SAME

(71) Applicant: Novelis Inc., Atlanta, GA (US)

(72) Inventors: Aurèle Mariaux, Muraz (CH); Juergen Timm, Steisslingen (DE); Guillaume Florey, Veyras (CH); Emanuel Beck, Miege (CH); Lasitha Cumaranatunge, Atlanta, GA (US); Peter Lloyd Redmond, Acworth, GA (US); Duane E. Bendzinski, Woodstock, GA (US); Aude Celine Despois, Grône (CH); Theresa Elizabeth MacFarlane, Woodstock, GA (US); Rajeev G. Kamat, Marietta, GA (US)

(73) Assignee: NOVELIS INC., Atlanta, GA (US)

( * ) Notice: Subject to any disclaimer, the term of this patent is extended or adjusted under 35 U.S.C. 154(b) by 0 days.

(21) Appl. No.: 17/759,064

(22) PCT Filed: Jan. 15, 2021

(86) PCT No.: PCT/US2021/013654
§ 371 (c)(1),
(2) Date: Jul. 19, 2022

(87) PCT Pub. No.: WO2021/183212
PCT Pub. Date: Sep. 16, 2021

(65) Prior Publication Data
US 2023/0052639 A1    Feb. 16, 2023

Related U.S. Application Data

(60) Provisional application No. 62/963,904, filed on Jan. 21, 2020.

(51) Int. Cl.
*C22C 21/10* (2006.01)
*B32B 15/01* (2006.01)

(52) U.S. Cl.
CPC ............ *C22C 21/10* (2013.01); *B32B 15/016* (2013.01)

(58) Field of Classification Search
None
See application file for complete search history.

(56) References Cited

U.S. PATENT DOCUMENTS 4,172,923 A * 10/1979 Kawase .................. F28F 19/06
                                                           138/143
7,472,740 B2    1/2009 Anderson et al.
(Continued)

FOREIGN PATENT DOCUMENTS

CN    107739923    2/2018
CN    110373576    10/2019
(Continued)

OTHER PUBLICATIONS

Merriam-Webster Dictionary Definition, https://www.merriam-webster.com/dictionary/cladding, accessed Aug. 14, 2023 (Year: 2023).*
(Continued)

*Primary Examiner* — Daniel J. Schleis
(74) *Attorney, Agent, or Firm* — Kilpatrick Townsend & Stockton LLP

(57) ABSTRACT

Provided herein are new aluminum alloys comprising Ca, Mg and/or Zn and new coated aluminum alloys comprising surface layers (e.g., coatings) comprising Ca, Mn, Zn, and/or Ni that can be used in aluminum alloy products, such as clad layers. Also provided are methods of making these aluminum alloys, coated aluminum alloys, and clad layers, as well as clad products. These alloys, coated alloys, clad layers, and
(Continued)

products possess a combination of strength and other key attributes, such as corrosion resistance, formability, and applicability of paint line pretreatments. The materials can be used in a variety of applications, including automotive, transportation, and electronics applications.

16 Claims, 9 Drawing Sheets

(56) References Cited

U.S. PATENT DOCUMENTS

| | | | |
|---|---|---|---|
| 7,748,434 | B2 | 7/2010 | Wagstaff |
| 8,927,113 | B2 | 1/2015 | Anderson et al. |
| 2017/0106919 | A1 | 4/2017 | Florey et al. |
| 2019/0264318 | A1* | 8/2019 | Ke .................. C23C 14/16 |

FOREIGN PATENT DOCUMENTS

| | | | |
|---|---|---|---|
| EP | 1852251 | | 11/2007 |
| JP | S62222034 | | 9/1987 |
| JP | H01198455 | * | 8/1989 |
| JP | H01255639 | * | 10/1989 |
| JP | H04173934 | * | 6/1992 |
| JP | H05230574 | | 9/1993 |
| JP | H06306519 | * | 11/1994 |
| JP | H1180871 | * | 3/1999 |

OTHER PUBLICATIONS

Budzynski et al., "Nitrogen Ion Implantation for Improvement of the Mechanical Surface Properties of Aluminum", Vacuum, vol. 81, No. 10, Jun. 9, 2007, pp. 1154-1158.
Donofrio, "Pretreatment Zinc Phosphating", Chemetall Products Inc., Dec. 2010, pp. 40-56.
Kim et al., "Microstructure and Mechanical Properties of Al—Si—Fe—Cu—Zn Alloys with Mn And Ca Addition", Materials Science and Technology, vol. 1, Jan. 1, 2018, pp. 113-116.
Mondolfo, L.F., "Part. 1: Pure and Commercial Aluminium, 1-Composition", Aluminum Alloys: Structure and Properties, Jan. 1, 1976, pp. 3-10.
International Application No. PCT/US2021/013654, International Search Report and Written Opinion, dated Dec. 6, 2021, 16 pages.
International Application No. PCT/US2021/013654, "Invitation To Pay Additional Fees And, Where Applicable, Protest Fee", dated Oct. 15, 2021, 13 pages.
European Application No. 21746582.2, "Office Action", dated Aug. 1, 2023, 9 pages.

* cited by examiner

ALUMINUM ALLOYS AND COATED ALUMINUM ALLOYS WITH HIGH CORROSION RESISTANCE AND METHODS OF MAKING THE SAME

PRIORITY

This application claims priority to and filing benefit of U.S. provisional application Ser. No. 62/963,904, filed Jan. 21, 2020, which is incorporated herein by reference in its entirety.

FIELD

The present disclosure relates to novel aluminum alloys, novel aluminum alloy clad layers, novel surface layers (e.g., coatings) for aluminum alloys, and products made from these novel aluminum alloys, novel aluminum alloy clad layers, and novel surface layers. The present disclosure also relates to methods of making novel aluminum alloys, novel aluminum alloy clad layers, novel surface layers, and products. The aluminum alloys clad layers and products display high corrosion resistance and excellent applicability of paint line pretreatments, in addition to good strength and formability.

BACKGROUND

To be useful in various applications, for example in the production of automobile components, an aluminum alloy product must offer a good combination of properties, especially when compared with the alternatives. A useful aluminum alloy product, for example a clad product or a coated aluminum alloy product, offers good formability and mechanical properties, along with other key attributes, such as corrosion resistance and high applicability of paint line pretreatments. Current aluminum alloy products may offer some of these properties, but not all. For example, previously known alloys may offer good formability and mechanical properties, along with sufficient applicability of paint line pretreatments, but limited corrosion resistance. Some previously known alloys may offer good formability, but may suffer from low strength and/or applicability of paint line pretreatments.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Provided herein are new aluminum alloys, new surface layers (e.g., coatings) for aluminum alloys, coated aluminum alloy products made from these new coatings, and new clad products made from these new aluminum alloys and new coated aluminum alloys, and methods of making clad aluminum alloy layers, clad products, and coated aluminum alloy products. These aluminum alloys, clad aluminum alloy layers, coated aluminum alloys, clad products, and coated aluminum alloy products possess a surprising combination of strength and other key attributes, such as corrosion resistance, formability, and good applicability of paint line pretreatments.

In one embodiment, the new aluminum alloys comprise calcium (Ca) and zinc (Zn). In another embodiment, the new aluminum alloys can comprise magnesium (Mg) and Zn. In yet another embodiment, the new aluminum alloys can comprise Ca, Mg, and Zn. In some aspects, the aluminum alloys described herein can be used as clad aluminum alloy layers and comprise Ca and Zn. In some aspects, the aluminum alloys described herein can be used as clad aluminum alloy layers and comprise Mg and Zn. In some aspects, the aluminum alloys described herein can be used as clad aluminum alloy layers and comprise Ca, Mg, and Zn. The clad aluminum alloy layers achieve excellent surface properties as described herein.

In another embodiment, the new coated aluminum alloy products comprise a surface layer (e.g., a coating) comprising Mg, Ca, Zn, nickel (Ni), or combinations thereof. The surface layer can be positioned on an aluminum alloy substrate. The Mg, Ca, Zn, Ni, or combination thereof can be in a form where the Mg, Ca, Zn, and/or Ni is available to inhibit corrosion in the aluminum alloy substrate.

DETAILED DESCRIPTION

Figure 1:
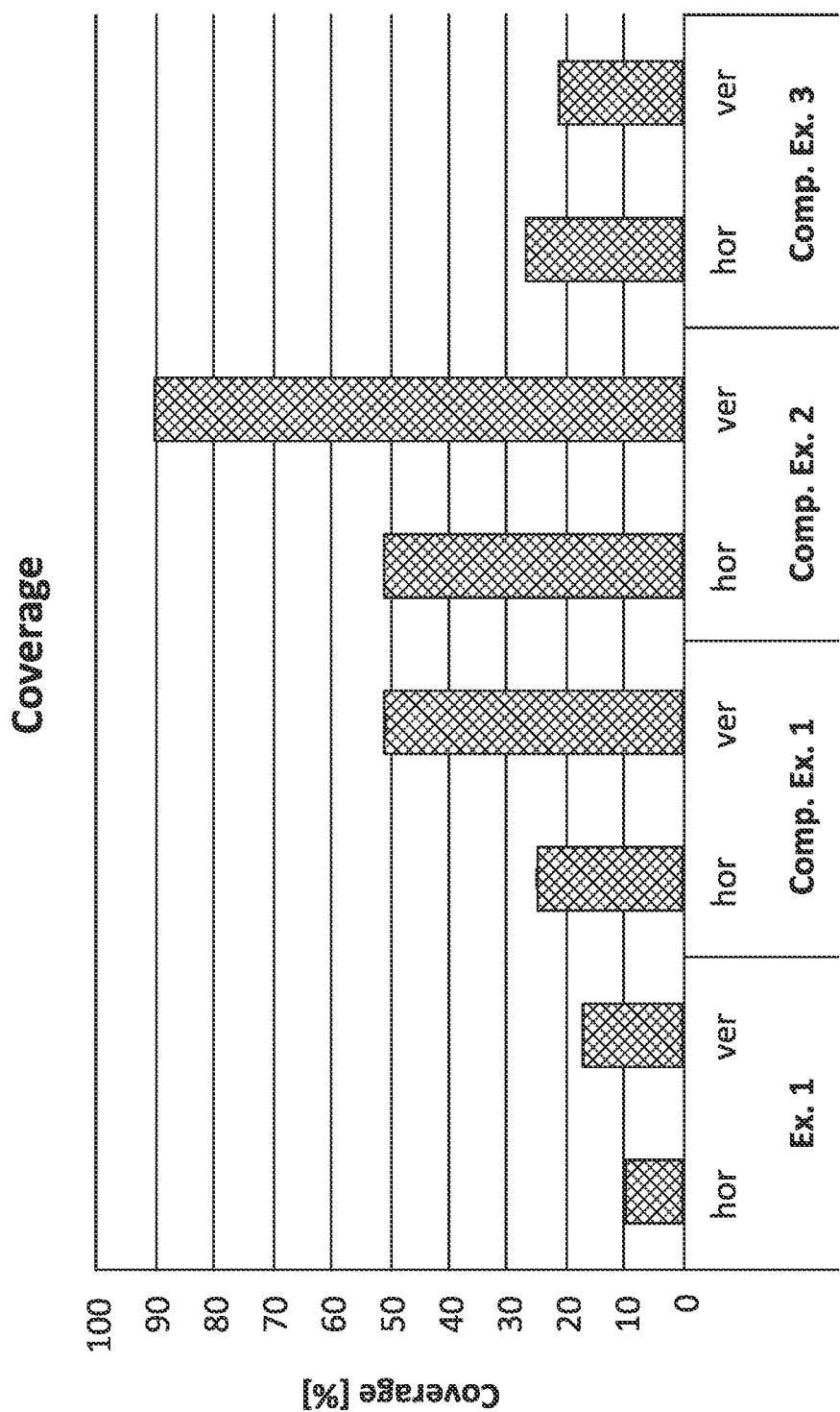
FIG. 1 is a graph of coverage results from filiform corrosion testing for clad aluminum alloy layers.

Described are new aluminum alloys, new surface layers (e.g., coatings) for aluminum alloys, coated aluminum alloy products made from these new coatings, and new clad products made from these new aluminum alloys and new coated aluminum alloys, and methods of making clad aluminum alloy layers, clad products, and coated aluminum alloy products. These aluminum alloys, clad aluminum alloy layers, coated aluminum alloys, clad products, and coated aluminum alloy products possess a surprising combination of strength and other key attributes, such as corrosion resistance, formability, and good applicability of paint line pretreatments.

Definitions and Descriptions

As used herein, the terms "invention," "the invention," "this invention," and "the present invention" are intended to refer broadly to all of the subject matter of this patent application and the claims below. Statements containing these terms should be understood not to limit the subject matter described herein or to limit the meaning or scope of the patent claims below.

In this description, reference is made to alloys identified by AA numbers and other related designations, such as "series" or "7xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, a plate generally has a thickness of greater than about 15 mm. For example, a plate may refer to an aluminum product having a thickness of greater than 15 mm, greater than 20 mm, greater than 25 mm, greater than 30 mm, greater than 35 mm, greater than 40 mm, greater than 45 mm, greater than 50 mm, or greater than 100 mm.

As used herein, a shate (also referred to as a sheet plate) generally has a thickness of from about 4 mm to about 15 mm. For example, a shate may have a thickness of 4 mm, 5 mm, 6 mm, 7 mm, 8 mm, 9 mm, 10 mm, 11 mm, 12 mm, 13 mm, 14 mm, or 15 mm.

As used herein, a sheet generally refers to an aluminum product having a thickness of less than about 4 mm. For example, a sheet may have a thickness of less than 4 mm, less than 3 mm, less than 2 mm, less than 1 mm, less than 0.5 mm, less than 0.3 mm, or less than 0.1 mm.

Reference is made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. An O condition or temper refers to an aluminum alloy after annealing. An Hxx condition or temper, also referred to herein as an H temper, refers to a non-heat treatable aluminum alloy after cold rolling with or without thermal treatment (e.g., annealing). Suitable H tempers include Hx1, Hx2, Hx3 Hx4, Hx5, Hx6, Hx7, Hx8, or Hx9 tempers. A T1 condition or temper refers to an aluminum alloy cooled from hot working and naturally aged (e.g., at room temperature). A T2 condition or temper refers to an aluminum alloy cooled from hot working, cold worked and naturally aged. A T3 condition or temper refers to an aluminum alloy solution heat treated, cold worked, and naturally aged. A T4 condition or temper refers to an aluminum alloy solution heat treated and naturally aged. A T5 condition or temper refers to an aluminum alloy cooled from hot working and artificially aged (at elevated temperatures). A T6x condition or temper refers to an aluminum alloy solution heat treated and artificially aged. A T7 condition or temper refers to an aluminum alloy solution heat treated and artificially overaged. A T8x condition or temper refers to an aluminum alloy solution heat treated, cold worked, and artificially aged. A T9 condition or temper refers to an aluminum alloy solution heat treated, artificially aged, and cold worked.

As used herein, terms such as "cast metal product," "cast product," "cast aluminum alloy product," and the like are interchangeable and refer to a product produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C. As used herein, the meaning of "ambient conditions" can include temperatures of about room temperature, relative humidity of from about 20% to about 100%, and barometric pressure of from about 975 millibar (mbar) to about 1050 mbar. For example, relative humidity can be about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100%, or anywhere in between. For example, barometric pressure can be about 975 mbar, about 980 mbar, about 985 mbar, about 990 mbar, about 995 mbar, about 1000 mbar, about 1005 mbar, about 1010 mbar, about 1015 mbar, about 1020 mbar, about 1025 mbar, about 1030 mbar, about 1035 mbar, about 1040 mbar, about 1045 mbar, about 1050 mbar, or anywhere in between.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

As used herein, the meaning of "a," "an," and "the" includes singular and plural references unless the context clearly dictates otherwise.

As used herein, "clad layer," "cladding layer," or "clad aluminum alloy layer" refers to a material that is or will be used as a cladding on a core layer. A "core layer" or "core aluminum alloy layer" refers to the inner material that can be the major component in a clad product (e.g., at least 50% or more of the clad product). A "clad product" or "clad aluminum alloy product" refers to the combination of at least one clad layer on a core layer.

As used herein, "corrosion coverage percent" means the corrosion coverage area as a percentage of the total area of the surface. "Corrosion coverage area" is the area that is covered by corrosion after the surface undergoes corrosion testing.

As used herein, "bond durability" refers to an ability of a bonding agent bonding two articles together to withstand cycled mechanical stress or non-cycled stress (e.g., using the Neutral Salt Spray ("NSS") test) after exposure to environmental conditions that initiate failure of the bonding agent. Bond durability can be characterized in terms of number of mechanical stress cycles applied to the bound articles until the bond fails in one example using cycled mechanical stress.

As used herein, "atomic percent" or "atomic %" is the number of atoms of a given component (e.g, Ca, Mg, Zn, and/or Ca) per 100 atoms of the material (e.g., aluminum alloy, substrate, sheet, surface), expressed as a percent.

Throughout the application, the aluminum alloy and clad products and their components are described in terms of their elemental composition in weight percent (wt. %). In some aspects, in each alloy the remainder is aluminum, with a maximum of 0.50 wt. % for the sum of all impurities (e.g., a maximum of 0.45 wt. %, a maximum of 0.40 wt. %, a maximum of 0.35 wt. %, a maximum of 0.30 wt. %, a maximum of 0.25 wt. %, a maximum of 0.20 wt. %, a maximum of 0.15 wt. %, and/or a maximum of 0.10 wt. %).

Aluminum Alloys

Described herein are new aluminum alloys that comprise Ca and Zn; Mg and Zn; or Ca, Mg, and Zn and can be, in some aspects, clad aluminum alloy layers (sometimes referred to as clad layers, or cladding). The inventors discovered that clad aluminum alloy layers containing amounts of Ca and Zn or Mg and Zn (or Ca, Mn, and Zn) as described herein surprisingly achieve exceptional resistance to filiform corrosion and excellent applicability of paint line pretreatments, in addition to good strength and formability. The prior conventional thinking in the art was that having increased Ca and/or Mg content, such as in the amounts described herein, would induce corrosion.

In some aspects, the aluminum alloy comprises up to about 1.0 wt. % Ca, e.g., up to about 0.95 wt. % Ca, up to about 0.90 wt. % Ca, up to about 0.85 wt. % Ca, up to about 0.80 wt. % Ca, up to about 0.75 wt. % Ca, up to about 0.70 wt. % Ca, up to about 0.65 wt. % Ca, up to about 0.60 wt. % Ca, up to about 0.55 wt. % Ca, up to about 0.50 wt. % Ca, up to about 0.45 wt. % Ca, up to about 0.40 wt. % Ca, up to about 0.35 wt. % Ca, up to about 0.30 wt. % Ca, up to about 0.25 wt. % Ca, up to about 0.20 wt. % Ca, up to about 0.15 wt. % Ca, up to about 0.10 wt. % Ca, up to about 0.05 wt. % Ca, or up to about 0.01 wt. % Ca. In terms of ranges, the aluminum alloy may comprise from about 0.01 wt. % to about 1.0 wt. % Ca, e.g., from about 0.03 wt. % to about 0.90 wt. % Ca, from about 0.05 wt. % to about 0.80 wt. % Ca, from about 0.10 wt. % to about 0.80 wt. % Ca, from about 0.20 wt. % to about 0.75 wt. % Ca, from about 0.20 wt. % to about 0.70 wt. % Ca, from about 0.20 wt. % to about 0.60 wt. % Ca, from about 0.20 wt. % to about 0.55 wt. % Ca, from about 0.25 wt. % to about 0.55 wt. % Ca, from about 0.25 wt. % to about 0.50 wt. % Ca, from about 0.25 wt. % to about 0.45 wt. % Ca, from about 0.30 wt. % to about 0.45 wt. % Ca, or from about 0.30 wt. % to about 0.40 wt. % Ca. In some embodiments, Ca is not present (e.g. 0%).

In some aspects, the aluminum alloy comprises up to about 3.0 wt. % Zn, e.g., up to about 2.9 wt. % Zn, up to about 2.8 wt. % Zn, up to about 2.7 wt. % Zn, up to about 2.6 wt. % Zn, up to about 2.5 wt. % Zn, up to about 2.4 wt. % Zn, up to about 2.3 wt. % Zn, up to about 2.2 wt. % Zn, up to about 2.1 wt. % Zn, up to about 2.0 wt. % Zn, up to about 1.9 wt. % Zn, up to about 1.8 wt. % Zn, up to about 1.7 wt. % Zn, up to about 1.6 wt. % Zn, up to about 1.5 wt. % Zn, up to about 1.4 wt. % Zn, up to about 1.3 wt. % Zn, up to about 1.2 wt. % Zn, up to about 1.1 wt. % Zn, up to about 1.0 wt. % Zn, up to about 0.95 wt. % Zn, up to about 0.90 wt. % Zn, up to about 0.85 wt. % Zn, up to about 0.80 wt. % Zn, up to about 0.75 wt. % Zn, up to about 0.70 wt. % Zn, up to about 0.65 wt. % Zn, up to about 0.60 wt. % Zn, up to about 0.55 wt. % Zn, up to about 0.50 wt. % Zn, up to about 0.45 wt. % Zn, up to about 0.40 wt. % Zn, up to about 0.35 wt. % Zn, up to about 0.30 wt. % Zn, up to about 0.25 wt. % Zn, up to about 0.20 wt. % Zn, up to about 0.15 wt. % Zn, up to about 0.10 wt. % Zn, up to about 0.05 wt. % Zn, or up to about 0.01 wt. % Zn. In terms of ranges, the aluminum alloy can comprise from about 0.01 wt. % and about 3.0 wt. % Zn, e.g., from about 0.03 wt. % to about 1.2 wt. % Zn, from about 0.05 wt. % to about 1.2 wt. % Zn, from about 0.10 wt. % to about 1.1 wt. % Zn, from about 0.20 wt. % to about 1.0 wt. % Zn, from about 0.30 wt. % to about 1.0 wt. % Zn, from about 0.40 wt. % to about 1.0 wt. % Zn, from about 0.20 wt. % to about 0.55 wt. % Zn, from about 0.25 wt. % to about 0.55 wt. % Zn, from about 0.25 wt. % to about 0.50 wt. % Zn, from about 0.25 wt. % to about 0.45 wt. % Zn, from about 0.30 wt. % to about 0.45 wt. % Zn, or from about 0.30 wt. % to about 0.40 wt. % Zn.

In some aspects, the aluminum alloy can comprise up to about 1.0 wt. % Mg, e.g., up to about 0.95 wt. % Mg, up to about 0.90 wt. % Mg, up to about 0.85 wt. % Mg, up to about 0.80 wt. % Mg, up to about 0.75 wt. % Mg, up to about 0.70 wt. % Mg, up to about 0.65 wt. % Mg, up to about 0.60 wt. % Mg, up to about 0.55 wt. % Mg, up to about 0.50 wt. % Mg, up to about 0.45 wt. % Mg, up to about 0.40 wt. % Mg, up to about 0.35 wt. % Mg, up to about 0.30 wt. % Mg, up to about 0.25 wt. % Mg, up to about 0.20 wt. % Mg, up to about 0.15 wt. % Mg, up to about 0.10 wt. % Mg, up to about 0.05 wt. % Mg, or up to about 0.01 wt. % Mg. In terms of ranges, the aluminum alloy can comprise from about 0.01 wt. % to about 1.0 wt. % Mg, e.g., from about 0.03 wt. % to about 0.95 wt. % Mg, from about 0.05 wt. % to about 0.90 wt. % Mg, from about 0.10 wt. % to about 0.90 wt. % Mg, from about 0.20 wt. % to about 0.85 wt. % Mg, from about 0.30 wt. % to about 0.85 wt. % Mg, from about 0.40 wt. % to about 0.85 wt. % Mg, or from about 0.50 wt. % to about 0.80 wt. % Mg. In some embodiments, Mg is not present (e.g. 0%).

In some aspects, the aluminum alloy comprises from about 0.01 wt. % to about 1.0 wt. % Ca, and from about 0.1 wt. % to about 2.0 wt. % Zn. In some aspects, the ratio of Ca wt. % to Zn wt. % in the aluminum alloy can be from about 1:10 to about 2:1 Ca to Zn (e.g., about 1:9 to about 1:1; about 1:7 to about 1:1; about 1:5 to about 1:1; about 1:4 to about 1:1; or about 1:3 to about 1:1.5). Optionally, the aluminum alloy can also comprise from about 0.01 wt. % to about 5.0 wt. % Si. Optionally, the aluminum alloy can comprise from about 0.05 wt. % to about 1.0 wt. % Fe. Optionally, the aluminum alloy can comprise from 0.01 wt. % to 1.0 wt. % Cu.

Further, in some aspects, the aluminum alloy comprises from about 0.01 wt. % to about 1.0 wt. % Mg, and from about 0.01 wt. % to about 2.0 wt. % Zn. In some aspects, the ratio of Mg wt. % to Zn wt. % in the aluminum alloy can be from about 100:1 to about 1:1 Mg to Zn (e.g., about 50:1 to about 1:1; about 50:1 to about 20:1; or about 20:1 to about 1:1). Optionally, the aluminum alloy can also comprise from about 0.01 wt. % to about 5.0 wt. % Si. Optionally, the aluminum alloy can comprise from about 0.05 wt. % to about 1.0 wt. % Fe. Optionally, the aluminum alloy can comprise from 0.01 wt. % to 1.0 wt. % Cu.

Further, in some aspects, the aluminum alloy comprises from about 0.01 wt. % to about 1.0 wt. % Ca, from about 0.01 wt. % to about 1.0 wt. % Mg, and from about 0.01 wt. % to about 2.0 wt. % Zn.

Aluminum Alloy Surface Layers

In addition to the new aluminum alloys containing Ca and Zn, Mg and Zn, or Ca, Zn and Mg, also described herein are new surface layers for (e.g., coatings) aluminum alloys, where the surface layers may comprise Mg, Ca, Zn, Ni, or combinations thereof. The surface layer(s) can be positioned on an aluminum alloy substrate, such as the aluminum alloys described above, or an aluminum alloy substrate other than those described above. The Mg, Ca, Zn, Ni, or combination thereof can be in a form where the Mg, Ca, Zn, and/or Ni is available to inhibit or prevent corrosion in the aluminum alloy substrate. The Mg, Ca, Zn, Ni, or combination thereof should also be present in an amount sufficient to inhibit or prevent corrosion in the aluminum alloy substrate. In certain aspects, an amount sufficient to inhibit or prevent corrosion in the aluminum alloy substrate can be at least about 0.3 atomic % of Mg, Ca, Zn, Ni, or a combination thereof (e.g., at least about 0.36 atomic %, at least about 0.38 atomic %, at least about 0.40 atomic %, at least about 0.42 atomic %, at least about 0.44 atomic %, at least about 0.45 atomic %, at least about 0.46 atomic %, at least about 0.48 atomic %, at least about 0.50 atomic %, at least about 0.55 atomic %, at least about 0.60 atomic %, at least about 0.65 atomic %, at least about 0.70 atomic %, at least about 0.75 atomic %, at least about 0.80 atomic %, at least about 0.85 atomic %, at least about 0.90 atomic %, at least about 0.95 atomic %, at least about 1.0 atomic %, at least about 1.5 atomic %, at least about 2.0 atomic %, at least about 2.5 atomic %, at least about 3.0 atomic %, at least about 3.5 atomic %, at least about 4.0 atomic %, at least about 4.5 atomic %, or at least about 5.0 atomic %). As one specific example, in certain aspects the amount sufficient to inhibit or prevent corrosion in the aluminum alloy substrate can be at least about 0.17 atomic % Ca and at least about 0.19 atomic % Zn (e.g., at least about 0.17 atomic % Ca and at least about 0.20 atomic % Zn, at least about 0.18 atomic % Ca and at least about 0.19 atomic % Zn, or at least about 0.18 atomic % Ca and at least about 0.20 atomic % Zn). In terms of ranges, in some aspects the amount sufficient to inhibit or prevent corrosion can be from about 0.3 atomic % of Mg, Ca, Zn, Ni, or a combination thereof to about 8.0 atomic % of Mg, Ca, Zn, Ni, or a combination thereof (e.g., from about 0.35 atomic % to about 6.0 atomic %, from about 0.36 atomic % to about 5.0 atomic %, from about 0.40 atomic % to about 4.0 atomic %, from about 0.45 atomic % to about 3.0 atomic %, from about 0.50 atomic % to about 2.0 atomic %, from about 0.55 atomic % to about 1.5 atomic %, or from about 0.60 atomic % to about 1.25 atomic %). In some aspects, the atomic % can be measured using x-ray photoelectron spectroscopy ("XPS").

For example, the coatings can comprise magnesium oxide (MgO), calcium oxide (CaO), zinc oxide (ZnO), or combinations thereof. Surprisingly, the coated aluminum alloys described show significant filiform corrosion resistance. Filiform corrosion typically occurs on coated surfaces when moisture or a corrosive solution contacts a metal surface. It is caused by active galvanic cells across the metal surface. Without being bound by theory, filiform corrosion in an aluminum alloy propagates with an acidic head and a relatively higher pH at the tail. This pH difference, combined with different oxygen concentrations (caused by oxygen diffusion), creates a net anodic reaction at the head and a net cathodic reaction at the tail, resulting in corrosion. The inventors surprisingly found that species such as the aforementioned MgO, CaO, and/or ZnO in the coating can poison the acidic nature of the head to interrupt corrosion propagation.

In another embodiment, corrosion of an aluminum alloy can be reduced by inhibiting the reactivity of the cathodic tail. The inventors surprisingly discovered that this could be accomplished by using a coating on an aluminum alloy to deliver an inorganic cathodic inhibitor. Some examples of inorganic cathodic inhibitors are the ions of Mg, Ca, Zn, Ni, or combinations thereof from the coating. These ions can react with the hydroxyl (⁻OH) of water to form insoluble hydroxides as $Mg(OH)_2$, $Ca(OH)_2$, $Zn(OH)_2$, or $Ni(OH)_2$ which are deposited on the cathodic site of the metal surface, protecting it. Other examples of inorganic cathodic inhibitors can include phosphonates, tannins, and/or lignins. In some embodiments, corrosion can be prevented both by the poisoning of the acidic nature of the corrosion head and inhibiting the cathodic tail.

In some aspects, the coatings described can be applied to the aluminum alloy surface with a chemical wash containing the Mg, Ca, Zn, Ni, or combinations thereof, for example in a rinse step, using physical vapor deposition ("PVD"), or using chemical vapor deposition ("CVD"). Some examples of methods that may be used to coat the aluminum alloy surface with a chemical wash are immersing (for example, by immersion of the aluminum alloy surface into a bath or other type of vessel containing Mg, Ca, Zn, and/or Ni ions), rinsing or spraying, or rolling an ion-containing fluid onto the surface. Suitable methods and conditions are selected and optimized based on various considerations, such as the type(s) of ion used and/or the type of the surface being treated.

The coated aluminum alloys described can be used in aluminum alloy products such as clad products. For example, the coated aluminum alloys can serve as a clad layer or as a core layer in a clad aluminum alloy product.

Properties of Aluminum Alloys and Coated Aluminum Alloys

Unexpectedly, the new aluminum alloys and coated aluminum alloys described herein exhibit exceptional corrosion resistance. The corrosion resistance can be measured by filiform corrosion tests ("FFC"), for example. The corrosion resistance can be tested according to standard methods used in the field. One example of such a standard method is ID-3678, ISO 4623-2 (2016). ASTM D2803 is another appropriate standard that can be used for testing the filiform corrosion. DIN EN ISO 9227 is also a standard that can be used for testing the filiform corrosion. Filiform corrosion is a particular form of crevice corrosion. This type of corrosion typically occurs on coated surfaces when moisture or a corrosive solution penetrates through the defective coatings it is caused by active galvanic cells across the metal surface. Surprisingly, the new aluminum alloys and new coated aluminum alloys described herein show significant filiform corrosion resistance when tested by standard test methods.

For example, the aluminum alloys and coated aluminum alloys described can have a corrosion coverage percent (i.e., the corrosion coverage area as a percentage of the total area) of 25% or less in the horizontal direction, the vertical direction, the diagonal direction, or in any and all combinations of these directions (measured separately) (e.g., 24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less) when undergoing filiform corrosion testing. In addition, the aluminum alloys and coated aluminum alloys can have an average filament length during filiform corrosion testing of 0.50 mm or less in the horizontal direction, the vertical direction, the diagonal direction, or in any and all combinations of these directions (measured separately) (e.g., 0.45 mm or less, 0.40 mm or less, 0.35 mm or less, 0.30 mm or less, 0.25 mm or less, 0.20 mm or less, 0.15 mm or less, 0.10 mm or less, or 0.05 mm or less).

In one aspect, the new aluminum alloys and coated aluminum alloys described herein can have a yield strength up to about 600 MPa in a T6 temper (e.g., from about 150 MPa to about 600 MPa, from about 300 MPa to about 600 MPa, or from about 400 MPa to about 600 MPa). In one aspect, the new aluminum alloys and coated aluminum alloys described herein can have a yield strength up to about 200 MPa in a T4 temper (e.g., from about 50 MPa to about 200 MPa, from about 100 MPa to about 200 MPa, or from about 120 MPa to about 200 MPa). The new aluminum alloys and coated aluminum alloys described herein can have an elongation (either total or uniform) in any direction or in any combination of directions (longitudinal (L), diagonal (D), and/or transverse (T)) of at least about 25% (measured separately) (e.g., at least about 26%, at least about 27%, at least about 28%, at least about 29%, at least about 30%, at least about 31%, at least about 32%, at least about 33%, at least about 34%, at least about 35%, at least about 36%, at least about 37%, at least about 38%, at least about 39%, at least about 40%, at least about 41%, at least about 42%, at least about 43%, at least about 44%, or at least about 45%). In terms of ranges, the new aluminum alloys and coated aluminum alloys described herein can have an elongation of from about 25% to about 50% (e.g., from about 27% to about 48%, from about 28% to about 47%, from about 29% to about 46%, from about 30% to about 45%, from about 30% to about 42%, from about 30% to about 41%, from about 31% to about 40%, from about 32% to about 40%, from about 32% to about 39%, or from about 35% to about 45%).

Due to the unexpected increased anti-corrosion properties of the inventive alloy products described, increased amounts of various metals can be used in the alloys that were previously avoided because of corrosion issues. For example, the aluminum alloys described can comprise significant levels of copper (Cu). For example, in some aspects, the aluminum alloys can comprise up to about 1.0 wt. % Cu, e.g., up to about 0.95 wt. % Cu, up to about 0.90 wt. % Cu, up to about 0.85 wt. % Cu, up to about 0.80 wt. % Cu, up to about 0.75 wt. % Cu, up to about 0.70 wt. % Cu, up to about 0.65 wt. % Cu, up to about 0.60 wt. % Cu, up to about 0.55 wt. %, up to about 0.50 wt. % Cu, up to about 0.45 wt. % Cu, up to about 0.40 wt. % Cu, up to about 0.35 wt. % Cu, up to about 0.30 wt. % Cu, up to about 0.25 wt. % Cu, up to about 0.20 wt. % Cu, up to about 0.15 wt. % Cu, or up to about 0.10 wt. % Cu. In terms of ranges, the aluminum alloys can optionally comprise from about 0.1 wt. % to about 1.0 wt. % Cu, e.g., from about 0.1 wt. % to about 0.8 wt. % Cu, from about 0.2 wt. % to about 0.7 wt. % Cu or from about 0.5 wt. % to about 0.6 wt. % Cu. Previously, such significant ranges of Cu may not have been used due to perceived corrosion.

Clad Aluminum Alloys

The new aluminum alloys and coated aluminum alloys described herein can be used as clad aluminum alloy layers in a clad aluminum alloy product. The clad aluminum alloy product described herein can comprise a first clad aluminum alloy layer located on a first side of a core aluminum alloy layer. In some aspects, the clad aluminum alloy product described herein can further comprise a second clad aluminum alloy layer located on a second side of the core layer. The first clad aluminum alloy layer and the second clad aluminum alloy layer can comprise the same or different alloys. In some aspects, the first clad aluminum alloy layer can comprise Ca, Zn, and Al. In some cases, the first clad aluminum alloy layer can comprise from about 0.01 wt. % to about 1.0 wt. % Ca, and from about 0.1 wt. % to about 2.0 wt. % Zn. In some aspects, the first clad aluminum alloy layer can comprise Mg, Zn, and Al. In some cases, the first clad aluminum alloy layer can comprise from about 0.01 wt. % to about 1.0 wt. % Mg, and from about 0.1 wt. % to about 2.0 wt. % Zn. In some aspects, the first clad aluminum alloy layer can comprise Ca, Zn, Mg and Al. In some aspects, the first clad aluminum alloy layer can comprise Mg, Zn, Ca, and Al. In some cases, the first clad aluminum alloy layer can comprise from about 0.01 wt. % to about 1.0 wt. % Mg, from about 0.1 wt. % to about 2.0 wt. % Zn and from about 0.01 wt. % to about 1.0 wt. % Ca. In some aspects, the first clad aluminum alloy can comprise a coating layer comprising ions of Mg, Ca, Zn, Ni, or combinations thereof positioned on an outward facing surface of the first clad aluminum alloy (i.e., on a surface facing away from the core layer).

In some aspects, the second clad aluminum alloy layer can comprise Ca, Zn, and Al. In some cases, the second clad aluminum alloy layer can comprise from about 0.01 wt. % to about 1.0 wt. % Ca, and from about 0.1 wt. % to about 2.0 wt. % Zn. In some aspects, the second clad aluminum alloy layer can comprise Mg, Zn, and Al. In some cases, the second clad aluminum alloy layer can comprise from about 0.01 wt. % to about 1.0 wt. % Mg, and from about 0.1 wt. % to about 2.0 wt. % Zn. In some aspects, the second clad aluminum alloy layer can comprise Mg, Zn, Ca, and Al. In some cases, the second clad aluminum alloy layer can comprise from about 0.01 wt. % to about 1.0 wt. % Mg, from about 0.1 wt. % to about 2.0 wt. % Zn and from about 0.01 wt. % to about 1.0 wt. % Ca. In some aspects, the second clad aluminum alloy can comprise a coating layer comprising ions of Mg, Ca, Zn, Ni, or combinations thereof positioned on an outward facing surface of the second clad aluminum alloy (i.e., on a surface facing away from the core layer).

Also provided are materials comprising the clad aluminum alloy products described herein. The materials can include automotive products (e.g., automotive structural parts), aerospace products (e.g., an aerospace structural part or an aerospace non-structural part), marine products (e.g., a marine structural part or a marine non-structural part), or electronic products (e.g., electronic device housings), among others. Further provided are aluminum alloy sheets, plates, and shates comprising a clad aluminum alloy product as described herein.

Clad Aluminum Alloy Products

The clad aluminum alloy products described include one or more clad aluminum alloy layers in contact with a core layer. In some examples, the core layer has a clad layer on only one side (i.e., one clad layer is present in the clad aluminum alloy product). In other examples, the core layer is cladded on more than one side, for example two sides (i.e., two clad layers are present in the clad aluminum alloy product). In one embodiment, at least one of the clad layers comprises Al, Ca, and Zn. In another embodiment, at least one of the clad layers comprises Al, Mg, and Zn. In another embodiment, at least one of the clad layers comprises Al, Ca, Mg, and Zn. In another embodiment, at least one of the clad layers comprises a coating comprising ions of Mg, Ca, Zn, Ni, or combinations thereof. This coating is positioned on the outside of the at least one clad layer, facing away from the core layer. Typically, the core layer is the larger component of the material, and therefore usually predominately determines the bulk mechanical properties of the clad product, for example the strength of the clad product. On the other hand, the clad layer(s), which typically (but not always) represent a smaller component of the clad product, are in contact with the surrounding environment and thus determine the chemical activity (e.g., corrosion resistance) and can affect the formability and joining properties of the clad product.

In some aspects, a first side of the core layer is adjacent to and contacts a first clad layer to form a first interface (e.g., no layers (such as a coating) intervene between the first clad layer and the first side of the core layer), although that need not be the case. In some aspects, the clad aluminum alloy product includes a second clad layer. In some instances, a second side of the core layer is adjacent to and contacts the second clad layer to form a second interface (i.e., no layers (such as a coating) intervene between the second clad layer and the second side of the core layer), although that need not be the case. In some aspects, the first clad layer and the second clad layer can be the same chemical composition. In other aspects, the first clad layer and the second clad layer can be different chemical compositions.

In some aspects, the thickness of the clad products can be from about 0.1 mm to about 6 mm (e.g., about 0.1 mm to about 5.8 mm, from about 0.2 mm to about 5.5 mm, from about 0.3 mm to about 5.3 mm, from about 0.4 mm to about 5.2 mm, from about 0.5 mm to about 5.0 mm, from about 0.6 mm to about 4.8 mm, from about 0.7 mm to about 4.6 mm, from about 0.8 mm to about 4.5 mm, from about 0.8 mm to about 4.3 mm, from about 0.9 mm to about 4.2 mm, from about 1 mm to about 4 mm, from about 1.3 mm to about 3.8 mm, from about 1.5 mm to about 3.5 mm, from about 1.7 mm to about 3.2 mm, or from about 2 mm to about 3 mm).

Core Layer

The core layer is an aluminum-containing alloy. In some aspects, the core layer can be any aluminum-containing alloy suitable as a core layer when covered by a clad layer comprising Al, Ca, and Zn; a clad layer comprising Al, Mg, and Zn; a clad layer comprising Al, Ca, Mg, and Zn; or a clad layer comprising a coating comprising ions of Mg, Ca, Zn, Ni, or combinations thereof. In aspects, the core layer can comprise the new aluminum alloys and/or new coated aluminum alloys described above.

The thickness of the core layer can be from about 30% to about 99% of the thickness of the clad aluminum alloy products described herein, e.g., from about 40% to 99%, from about 50% to 99%, from about 55% to 99%, from about 60% to 98%, from about 70% to 98%, from about 75% to 95%, or from about 80% to 90%. For example, in a clad aluminum alloy product having a thickness of about 1000 microns, the core layer can have a thickness of about 300 microns to about 990 microns. Optionally, the core layer can have a thickness in the range of about 0.1 mm to about 5 mm (e.g., about 0.5 mm to about 3 mm, from about 0.7 mm to about 2.5 mm, or from about 1 mm to about 2.2 mm). For example, the thickness of the core layer can be about 0.5 mm, about 0.6 mm, about 0.7 mm, about 0.8 mm, about 0.9 mm, about 1.0 mm, about 1.1 mm, about 1.2 mm, about 1.3 mm, about 1.4 mm, about 1.5 mm, about 1.6 mm, about 1.7 mm, about 1.8 mm, about 1.9 mm, about 2.0 mm, about 2.1 mm, about 2.2 mm, about 2.3 mm, about 2.4 mm, about 2.5 mm, about 2.6 mm, about 2.7 mm, about 2.8 mm, about 2.9 mm, or about 3.0 mm.

In some examples, any alloy designated as a "1xxx series" alloy is suitable for use as the core layer. By way of non-limiting example, the 1xxx series alloys suitable for use as the core layer can include AA1100, AA1100A, AA1200, AA1200A, AA1300, AA1110, AA1120, AA1230, AA1230A, AA1235, AA1435, AA1145, AA1345, AA1445, AA1150, AA1350, AA1350A, AA1450, AA1370, AA1275, AA1185, AA1285, AA1385, AA1188, AA1190, AA1290, AA1193, AA1198, or AA1199.

In some examples, any alloy designated as a "2xxx series" alloy is suitable for use as the core layer. By way of non-limiting example, the 2xxx series alloys suitable for use as the core layer can include AA2001, A2002, AA2004, AA2005, AA2006, AA2007, AA2007A, AA2007B, AA2008, AA2009, AA2010, AA2011, AA2011A, AA2111, AA2111A, AA2111B, AA2012, AA2013, AA2014, AA2014A, AA2214, AA2015, AA2016, AA2017, AA2017A, AA2117, AA2018, AA2218, AA2618, AA2618A, AA2219, AA2319, AA2419, AA2519, AA2021, AA2022, AA2023, AA2024, AA2024A, AA2124, AA2224, AA2224A, AA2324, AA2424, AA2524, AA2624, AA2724, AA2824, AA2025, AA2026, AA2027, AA2028, AA2028A, AA2028B, AA2028C, AA2029, AA2030, AA2031, AA2032, AA2034, AA2036, AA2037, AA2038, AA2039, AA2139, AA2040, AA2041, AA2044, AA2045, AA2050, AA2055, AA2056, AA2060, AA2065, AA2070, AA2076, AA2090, AA2091, AA2094, AA2095, AA2195, AA2295, AA2196, AA2296, AA2097, AA2197, AA2297, AA2397, AA2098, AA2198, AA2099, or AA2199.

In some examples, any alloy designated as a "3xxx series" alloy is suitable for use as the core layer. By way of non-limiting example, the 3xxx series alloys suitable for use as the core layer can include AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, or AA3065.

In some examples, any alloy designated as a "4xxx series" alloy is suitable for use as the core layer. By way of non-limiting example, the 4xxx series alloys suitable for use as the core layer can include AA4004, AA4104, AA4006, AA4007, AA4008, AA4009, AA4010, AA4013, AA4014, AA4015, AA4015A, AA4115, AA4016, AA4017, AA4018, AA4019, AA4020, AA4021, AA4026, AA4032, AA4043, AA4043A, AA4143, AA4343, AA4643, AA4943, AA4044, AA4045, AA4145, AA4145A, AA4046, AA4047, AA4047A, or AA4147.

In some examples, any alloy designated as a "5xxx series" alloy is suitable for use as the core layer. By way of non-limiting example, the 5xxx series alloys suitable for use as the core layer can include AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, or AA5088.

In some examples, any alloy designated as a "6xxx series" alloy is suitable for use as the core layer. By way of non-limiting example, the 6xxx series alloys suitable for use as the core layer can include AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, or AA6092.

In some examples, any alloy designated as a "7xxx series" alloy is suitable for use as the core layer. By way of non-limiting example, the 7xxx series alloys suitable for use as the core layer can include AA7011, AA7019, AA7020, AA7021, AA7039, AA7072, AA7075, AA7085, AA7108, AA7108A, AA7015, AA7017, AA7018, AA7019A, AA7024, AA7025, AA7028, AA7030, AA7031, AA7033, AA7035, AA7035A, AA7046, AA7046A, AA7003, AA7004, AA7005, AA7009, AA7010, AA7011, AA7012, AA7014, AA7016, AA7116, AA7122, AA7023, AA7026, AA7029, AA7129, AA7229, AA7032, AA7033, AA7034, AA7036, AA7136, AA7037, AA7040, AA7140, AA7041, AA7049, AA7049A, AA7149,7204, AA7249, AA7349, AA7449, AA7050, AA7050A, AA7150, AA7250, AA7055, AA7155, AA7255, AA7056, AA7060, AA7064, AA7065, AA7068, AA7168, AA7175, AA7475, AA7076, AA7178, AA7278, AA7278A, AA7081, AA7181, AA7185, AA7090, AA7093, AA7095, or AA7099.

In some examples, any alloy designated as an "8xxx series" alloy is suitable for use as the core layer. By way of non-limiting example, the 8xxx series alloys suitable for use as the core layer can include AA8005, AA8006, AA8007, AA8008, AA8010, AA8011, AA8011A, AA8111, AA8211, AA8112, AA8014, AA8015, AA8016, AA8017, AA8018, AA8019, AA8021, AA8021A, AA8021B, AA8022, AA8023, AA8024, AA8025, AA8026, AA8030, AA8130, AA8040, AA8050, AA8150, AA8076, AA8076A, AA8176, AA8077, AA8177, AA8079, AA8090, AA8091, or AA8093.

Clad Layer(s)

Also described herein is an aluminum alloy for use as a clad aluminum alloy layer in clad aluminum alloy products. In addition to aluminum, the clad aluminum alloy layer comprises Ca and Zn, or Zn and Mg, or Ca, Zn and Mg and achieves excellent surface properties.

The thickness of each clad aluminum alloy layer can be from about 1% to about 50% of the total thickness the clad aluminum alloy products described herein (e.g., from about 1% to about 25%, from about 1% to about 20%, from about 1% to about 15%, from about 1% to about 12%, or about 10%). For example, in a clad aluminum alloy product having a thickness of 1000 microns, each clad aluminum alloy layer can have a thickness up to about 250 microns (e.g., up to about 200 microns, up to about 180 microns, up to about 160 microns, up to about 150 microns, up to about 130 microns, up to about 120 microns, up to about 100 microns, up to about 80 microns, up to about 50 microns, up to about 30 microns, up to about 20 microns, up to about 15 microns, from about 10 microns to about 250 microns, from about 20 microns to about 200 microns, from about 25 microns to about 200 microns, from about 40 microns to about 180 microns, from about 50 microns to about 150 microns, or from about 70 microns to about 130 microns). Optionally, each clad aluminum alloy layer can have a thickness in the range of about 0.10 mm to about 1.0 mm (e.g., about 0.20 mm to about 0.80 mm, about 0.25 mm to about 0.70 mm, about 0.30 mm to about 0.75 mm, about 0.35 mm to about 0.70 mm, about 0.40 mm to about 0.65 mm, about 0.40 mm to about 0.60 mm, or about 0.50 mm).

In some aspects, the clad aluminum alloy layer comprises up to about 1.0 wt. % Ca, e.g., up to about 0.95 wt. % Ca, up to about 0.90 wt. % Ca, up to about 0.85 wt. % Ca, up to about 0.80 wt. % Ca, up to about 0.75 wt. % Ca, up to about 0.70 wt. % Ca, up to about 0.65 wt. % Ca, up to about 0.60 wt. % Ca, up to about 0.55 wt. % Ca, up to about 0.50 wt. % Ca, up to about 0.45 wt. % Ca, up to about 0.40 wt. % Ca, up to about 0.35 wt. % Ca, up to about 0.30 wt. % Ca, up to about 0.25 wt. % Ca, up to about 0.20 wt. % Ca, up to about 0.15 wt. % Ca, up to about 0.10 wt. % Ca, up to about 0.05 wt. % Ca, or up to about 0.01 wt. % Ca. In terms of ranges, the clad aluminum alloy layer may comprise from about 0.01 wt. % to 1.0 wt. % Ca, e.g., from about 0.03 wt. % to about 0.90 wt. % Ca, from about 0.05 wt. % to about 0.80 wt. % Ca, from about 0.10 wt. % to about 0.80 wt. % Ca, from about 0.20 wt. % to about 0.75 wt. % Ca, from about 0.20 wt. % to about 0.70 wt. % Ca, from about 0.20 wt. % to about 0.60 wt. % Ca, from about 0.20 wt. % to about 0.55 wt. % Ca, from about 0.25 wt. % to about 0.55 wt. % Ca, from about 0.25 wt. % to about 0.50 wt. % Ca, from about 0.25 wt. % to about 0.45 wt. % Ca, from about 0.30 wt. % to about 0.45 wt. % Ca, or from about 0.30 wt. % to about 0.40 wt. % Ca. Additionally, the clad aluminum alloy layer comprises up to about 3.0 wt. % Zn, up to about 2.9 wt. % Zn, up to about 2.8 wt. % Zn, up to about 2.7 wt. % Zn, up to about 2.6 wt. % Zn, up to about 2.5 wt. % Zn, up to about 2.4 wt. % Zn, up to about 2.3 wt. % Zn, up to about 2.2 wt. % Zn, up to about 2.1 wt. % Zn, up to about 2.0 wt. % Zn, up to about 1.9 wt. % Zn, up to about 1.8 wt. % Zn, up to about 0.85 wt. % Zn, up to about 0.80 wt. % Zn, up to about 0.75 wt. % Zn, up to about 0.70 wt. % Zn, up to about 0.65 wt. % Zn, up to about 0.60 wt. % Zn, up to about 0.55 wt. % Zn, up to about 0.50 wt. % Zn, up to about 0.45 wt. % Zn, up to about 0.40 wt. % Zn, up to about 0.35 wt. % Zn, up to about 0.30 wt. % Zn, up to about 0.25 wt. % Zn, up to about 0.20 wt. % Zn, up to about 0.15 wt. % Zn, up to about 0.10 wt. % Zn, up to about 0.05 wt. % Zn, or up to about 0.01 wt. % Zn. In some aspects, the clad aluminum alloy layer may comprise at least 0.30 wt. % Zn, e.g., at least 0.31 wt. % Zn, at least 0.32 wt. % Zn, at least 0.33 wt. % Zn, at least 0.34 wt. % Zn, at least 0.35 wt. % Zn, at least 0.38 wt. % Zn, at least 0.40 wt. % Zn, at least 0.43 wt. % Zn, at least 0.45 wt. % Zn, at least 0.47 wt. % Zn, at least 0.48 wt. % Zn, at least 0.50 wt. % Zn, at least 0.51 wt. % Zn, at least 0.55 wt. % Zn, at least 0.60 wt. % Zn, at least 0.70 wt. % Zn, at least 0.80 wt. % Zn, at least 0.90 wt. % Zn, at least 1.0 wt. % Zn, at least 1.1 wt. % Zn, at least 1.2 wt. % Zn, at least 1.3 wt. % Zn, at least 1.4 wt. % Zn, at least 1.5 wt. % Zn, at least 1.6 wt. % Zn, at least 1.7 wt. % Zn, at least 1.8 wt. % Zn, at least 1.9 wt. % Zn, at least 2.2 wt. % Zn, at least 2.5 wt. % Zn, or at least 2.7 wt. % Zn. In terms of ranges, the clad layer may comprise from about 0.01 wt. % to about 3.0 wt. % Zn, e.g., from about 0.01 wt. % to about 2.0 wt. % Zn, from about 0.01 wt. % to about 1.5 wt. % Zn, from about 0.03 wt. % to about 0.90 wt. % Zn, from about 0.05 wt. % to about 0.80 wt. % Zn, from about 0.10 wt. % to about 0.80 wt. % Zn, from about 0.20 wt. % to about 0.75 wt. % Zn, from about 0.20 wt. % to about 0.70 wt. % Zn, from about 0.20 wt. % to about 0.60 wt. % Zn, from about 0.20 wt. % to about 0.55 wt. % Zn, from about 0.25 wt. % to about 0.55 wt. % Zn, from about 0.25 wt. % to about 0.50 wt. % Zn, from about 0.25 wt. % to about 0.45 wt. % Zn, from about 0.30 wt. % to about 0.45 wt. % Zn, or from about 0.30 wt. % to about 0.40 wt. % Zn.

Thus, in terms of ratios, in some aspects the Ca and Zn can be present in the clad aluminum alloy layer in a ratio of about 1:10 to about 2:1 Ca to Zn (e.g., about 1:9 to about 1:1; about 1:7 to about 1:1; about 1:5 to about 1:1; about 1:4 to about 1:1; or about 1:3 to about 1:1.5), as determined by weight.

In other aspects, the clad aluminum alloy comprises up to about 1.0 wt. % Mg, e.g., up to about 0.95 wt. % Mg, up to about 0.90 wt. % Mg, up to about 0.85 wt. % Mg, up to about 0.80 wt. % Mg, up to about 0.75 wt. % Mg, up to about 0.70 wt. % Mg, up to about 0.65 wt. % Mg, up to about 0.60 wt. % Mg, up to about 0.55 wt. % Mg, up to about 0.50 wt. % Mg, up to about 0.45 wt. % Mg, up to about 0.40 wt. % Mg, up to about 0.35 wt. % Mg, up to about 0.30 wt. % Mg, up to about 0.25 wt. % Mg, up to about 0.20 wt. % Mg, up to about 0.15 wt. % Mg, up to about 0.10 wt. % Mg, up to about 0.05 wt. % Mg, or up to about 0.01 wt. % Mg. In terms of ranges, the clad aluminum alloy may comprise from about 0.01 wt. % to about 1.0 wt. % Mg, e.g., from about 0.03 wt. % to about 0.95 wt. % Mg, from about 0.05 wt. % to about 0.90 wt. % Mg, from about 0.10 wt. % to about 0.90 wt. % Mg, from about 0.20 wt. % to about 0.85 wt. % Mg, from about 0.30 wt. % to about 0.85 wt. % Mg, from about 0.40 wt. % to about 0.85 wt. % Mg, or from about 0.50 wt. % to about 0.80 wt. % Mg. Additionally, the clad aluminum alloy layer comprises up to about 3.0 wt. % Zn, up to about 2.9 wt. % Zn, up to about 2.8 wt. % Zn, up to about 2.7 wt. % Zn, up to about 2.6 wt. % Zn, up to about 2.5 wt. % Zn, up to about 2.4 wt. % Zn, up to about 2.3 wt. % Zn, up to about 2.2 wt. % Zn, up to about 2.1 wt. % Zn, up to about 2.0 wt. % Zn, up to about 1.9 wt. % Zn, up to about 1.8 wt. % Zn, up to about 0.85 wt. % Zn, up to about 0.80 wt. % Zn, up to about 0.75 wt. % Zn, up to about 0.70 wt. % Zn, up to about 0.65 wt. % Zn, up to about 0.60 wt. % Zn, up to about 0.55 wt. % Zn, up to about 0.50 wt. % Zn, up to about 0.45 wt. % Zn, up to about 0.40 wt. % Zn, up to about 0.35 wt. % Zn, up to about 0.30 wt. % Zn, up to about 0.25 wt. % Zn, up to about 0.20 wt. % Zn, up to about 0.15 wt. % Zn, up to about 0.10 wt. % Zn, up to about 0.05 wt. % Zn, or up to about 0.01 wt. % Zn. In some aspects, the clad aluminum alloy layer may comprise at least 0.30 wt. % Zn, e.g., at least 0.31 wt. % Zn, at least 0.32 wt. % Zn, at least 0.33 wt. % Zn, at least 0.34 wt. % Zn, at least 0.35 wt. % Zn, at least 0.38 wt. % Zn, at least 0.40 wt. % Zn, at least 0.43 wt. % Zn, at least 0.45 wt. % Zn, at least 0.47 wt. % Zn, at least 0.48 wt. % Zn, at least 0.50 wt. % Zn, at least 0.51 wt. % Zn, at least 0.55 wt. % Zn, at least 0.60 wt. % Zn, at least 0.70 wt. % Zn, at least 0.80 wt. % Zn, at least 0.90 wt. % Zn, at least 1.0 wt. % Zn, at least 1.1 wt. % Zn, at least 1.2 wt. % Zn, at least 1.3 wt. % Zn, at least 1.4 wt. % Zn, at least 1.5 wt. % Zn, at least 1.6 wt. % Zn, at least 1.7 wt. % Zn, at least 1.8 wt. % Zn, at least 1.9 wt. % Zn, at least 2.2 wt. % Zn, at least 2.5 wt. % Zn, at least 2.7 wt. % Zn. In terms of ranges, the clad layer may comprise from about 0.01 wt. % to about 3.0 wt. % Zn, e.g., from about 0.01 wt. % to about 2.0 wt. % Zn, from about 0.01 wt. % to about 1.5 wt. % Zn, from about 0.03 wt. % to about 0.90 wt. % Zn, from about 0.05 wt. % to about 0.80 wt. % Zn, from about 0.10 wt. % to about 0.80 wt. % Zn, from about 0.20 wt. % to about 0.75 wt. % Zn, from about 0.20 wt. % to about 0.70 wt. % Zn, from about 0.20 wt. % to about 0.60 wt. % Zn, from about 0.20 wt. % to about 0.55 wt. % Zn, from about 0.25 wt. % to about 0.55 wt. % Zn, from about 0.25 wt. % to about 0.50 wt. % Zn, from about 0.25 wt. % to about 0.45 wt. % Zn, from about 0.30 wt. % to about 0.45 wt. % Zn, or from about 0.30 wt. % to about 0.40 wt. % Zn.

Thus, in terms of ratios, in some aspects the Mg and Zn in the clad aluminum alloy can be in ratios from about 100:1 to about 1:1 Mg to Zn (e.g., about 50:1 to about 1:1; about 50:1 to about 20:1; or about 20:1 to about 1:1).

In other aspects, the clad aluminum alloy layer comprises up to about 1.0 wt. % Ca, e.g., up to about 0.95 wt. % Ca, up to about 0.90 wt. % Ca, up to about 0.85 wt. % Ca, up to about 0.80 wt. % Ca, up to about 0.75 wt. % Ca, up to about 0.70 wt. % Ca, up to about 0.65 wt. % Ca, up to about 0.60 wt. % Ca, up to about 0.55 wt. % Ca, up to about 0.50 wt. % Ca, up to about 0.45 wt. % Ca, up to about 0.40 wt. % Ca, up to about 0.35 wt. % Ca, up to about 0.30 wt. % Ca, up to about 0.25 wt. % Ca, up to about 0.20 wt. % Ca, up to about 0.15 wt. % Ca, up to about 0.10 wt. % Ca, up to about 0.05 wt. % Ca, or up to about 0.01 wt. % Ca. In terms of ranges, the clad aluminum alloy layer may comprise from about 0.01 wt. % to 1.0 wt. % Ca, e.g., from about 0.03 wt. % to about 0.90 wt. % Ca, from about 0.05 wt. % to about 0.80 wt. % Ca, from about 0.10 wt. % to about 0.80 wt. % Ca, from about 0.20 wt. % to about 0.75 wt. % Ca, from about 0.20 wt. % to about 0.70 wt. % Ca, from about 0.20 wt. % to about 0.60 wt. % Ca, from about 0.20 wt. % to about 0.55 wt. % Ca, from about 0.25 wt. % to about 0.55 wt. % Ca, from about 0.25 wt. % to about 0.50 wt. % Ca, from about 0.25 wt. % to about 0.45 wt. % Ca, from about 0.30 wt. % to about 0.45 wt. % Ca, or from about 0.30 wt. % to about 0.40 wt. % Ca. Additionally, the clad aluminum alloy comprises up to about 1.0 wt. % Mg, e.g., up to about 0.95 wt. % Mg, up to about 0.90 wt. % Mg, up to about 0.85 wt. % Mg, up to about 0.80 wt. % Mg, up to about 0.75 wt. % Mg, up to about 0.70 wt. % Mg, up to about 0.65 wt. % Mg, up to about 0.60 wt. % Mg, up to about 0.55 wt. % Mg, up to about 0.50 wt. % Mg, up to about 0.45 wt. % Mg, up to about 0.40 wt. % Mg, up to about 0.35 wt. % Mg, up to about 0.30 wt. % Mg, up to about 0.25 wt. % Mg, up to about 0.20 wt. % Mg, up to about 0.15 wt. % Mg, up to about 0.10 wt. % Mg, up to about 0.05 wt. % Mg, or up to about 0.01 wt. % Mg. In terms of ranges, the clad aluminum alloy may comprise from about 0.01 wt. % to about 1.0 wt. % Mg, e.g., from about 0.03 wt. % to about 0.95 wt. % Mg, from about 0.05 wt. % to about 0.90 wt. % Mg, from about 0.10 wt. % to about 0.90 wt. % Mg, from about 0.20 wt. % to about 0.85 wt. % Mg, from about 0.30 wt. % to about 0.85 wt. % Mg, from about 0.40 wt. % to about 0.85 wt. % Mg, or from about 0.50 wt. % to about 0.80 wt. % Mg. Additionally, the clad aluminum alloy layer comprises up to about 3.0 wt. % Zn, up to about 2.9 wt. % Zn, up to about 2.8 wt. % Zn, up to about 2.7 wt. % Zn, up to about 2.6 wt. % Zn, up to about 2.5 wt. % Zn, up to about 2.4 wt. % Zn, up to about 2.3 wt. % Zn, up to about 2.2 wt. % Zn, up to about 2.1 wt. % Zn, up to about 2.0 wt. % Zn, up to about 1.9 wt. % Zn, up to about 1.8 wt. % Zn, up to about 0.85 wt. % Zn, up to about 0.80 wt. % Zn, up to about 0.75 wt. % Zn, up to about 0.70 wt. % Zn, up to about 0.65 wt. % Zn, up to about 0.60 wt. % Zn, up to about 0.55 wt. % Zn, up to about 0.50 wt. % Zn, up to about 0.45 wt. % Zn, up to about 0.40 wt. % Zn, up to about 0.35 wt. % Zn, up to about 0.30 wt. % Zn, up to about 0.25 wt. % Zn, up to about 0.20 wt. % Zn, up to about 0.15 wt. % Zn, up to about 0.10 wt. % Zn, up to about 0.05 wt. % Zn, or up to about 0.01 wt. % Zn. In some aspects, the clad aluminum alloy layer may comprise at least 0.30 wt. % Zn, e.g., at least 0.31 wt. % Zn, at least 0.32 wt. % Zn, at least 0.33 wt. % Zn, at least 0.34 wt. % Zn, at least 0.35 wt. % Zn, at least 0.38 wt. % Zn, at least 0.40 wt. % Zn, at least 0.43 wt. % Zn, at least 0.45 wt. % Zn, at least 0.47 wt. % Zn, at least 0.48 wt. % Zn, at least 0.50 wt. % Zn, at least 0.51 wt. % Zn, at least 0.55 wt. % Zn, at least 0.60 wt. % Zn, at least 0.70 wt. % Zn, at least 0.80 wt. % Zn, at least 0.90 wt. % Zn, at least 1.0 wt. % Zn, at least 1.1 wt. % Zn, at least 1.2 wt. % Zn, at least 1.3 wt. % Zn, at least 1.4 wt. % Zn, at least 1.5 wt. % Zn, at least 1.6 wt. % Zn, at least 1.7 wt. % Zn, at least 1.8 wt. % Zn, at least 1.9 wt. % Zn, at least 2.2 wt. % Zn, at least 2.5 wt. % Zn, or at least 2.7 wt. % Zn. In terms of ranges, the clad layer may comprise from about 0.01 wt. % to about 3.0 wt. % Zn, e.g., from about 0.01 wt. % to about 2.0 wt. % Zn, from about 0.01 wt. % to about 1.5 wt. % Zn, from about 0.03 wt. % to about 0.90 wt. % Zn, from about 0.05 wt. % to about 0.80 wt. % Zn, from about 0.10 wt. % to about 0.80 wt. % Zn, from about 0.20 wt. % to about 0.75 wt. % Zn, from about 0.20 wt. % to about 0.70 wt. % Zn, from about 0.20 wt. % to about 0.60 wt. % Zn, from about 0.20 wt. % to about 0.55 wt. % Zn, from about 0.25 wt. % to about 0.55 wt. % Zn, from about 0.25 wt. % to about 0.50 wt. % Zn, from about 0.25 wt. % to about 0.45 wt. % Zn, from about 0.30 wt. % to about 0.45 wt. % Zn, or from about 0.30 wt. % to about 0.40 wt. % Zn.

Thus, in terms of ratios, in some aspects the Ca and Zn can be present in the clad aluminum alloy layer in a ratio of about 1:10 to about 2:1 Ca to Zn (e.g., about 1:9 to about 1:1; about 1:7 to about 1:1; about 1:5 to about 1:1; about 1:4 to about 1:1; or about 1:3 to about 1:1.5), as determined by weight. Also, the Ca and Mg can be present in the clad aluminum alloy layer in a ratio of about 1:100 to about 100:1 Ca to Mg.

The clad aluminum alloy layer can optionally comprise silicon (Si). In some aspects, the clad aluminum alloy layer can comprise up to about 5.0 wt. % Si, e.g., up to about 4.5 wt. % Si, up to about 4.0 wt. % Si, up to about 3.0 wt. % Si, up to about 2.0 wt. % Si, up to about 1.0 wt. % Si, up to about 0.50 wt. % Si, up to about 0.25 wt. % Si, up to about 0.10 wt. % Si, up to about 0.05 wt. % Si, up to about 0.04 wt. % Si, up to about 0.03 wt. % Si, up to about 0.02 wt. % Si, or up to about 0.01 wt. % Si. In terms of ranges, the clad layer can optionally comprise from about 0.01 wt. % to about 5.0 wt. % Si, e.g., from about 0.03 wt. % to about 3.0 wt. % Si, from about 0.03 wt. % to about 1.0 wt. % Si, from about 0.03 wt. % to about 0.50 wt. % Si, from about 0.03 wt. % to about 0.10 wt. % Si, or from about 0.04 wt. % to about 0.06 wt. % Si. In some embodiments, Si is not present (e.g., 0 wt. %).

The clad aluminum alloy layer can optionally comprise up to about 1.0 wt. % iron (Fe), e.g., up to about 0.95 wt. % Fe, up to about 0.90 wt. % Fe, up to about 0.85 wt. % Fe, up to about 0.80 wt. % Fe, up to about 0.75 wt. % Fe, up to about 0.70 wt. % Fe, up to about 0.65 wt. % Fe, up to about 0.60 wt. % Fe, up to about 0.55 wt. % Fe, up to about 0.50 wt. % Fe, up to about 0.45 wt. % Fe, up to about 0.40 wt. % Fe, up to about 0.35 wt. % Fe, up to about 0.30 wt. % Fe, up to about 0.25 wt. % Fe, up to about 0.20 wt. % Fe, up to about 0.15 wt. % Fe, up to about 0.10 wt. % Fe, up to about 0.08 wt. % Fe, up to about 0.05 wt. % Fe, up to about 0.03 wt. % Fe, or up to about 0.01 wt. % Fe. In terms of ranges, the clad aluminum alloy layer can optionally comprise from about 0.01 wt. % to about 1.0 wt. % Fe, e.g., from about 0.03 wt. % to about 0.90 wt. % Fe, from about 0.05 wt. % to about 0.80 wt. % Fe, from about 0.08 wt. % to about 0.80 wt. % Fe, from about 0.08 wt. % to about 0.75 wt. % Fe, from about 0.01 wt. % to about 0.70 wt. % Fe, from about 0.20 wt. % to about 0.60 wt. % Fe, from about 0.20 wt. % to about 0.55 wt. % Fe, from about 0.25 wt. % to about 0.55 wt. % Fe, from about 0.25 wt. % to about 0.50 wt. % Fe, or from about 0.30 wt. % to about 0.50 wt. % Fe. In some embodiments, Fe is not present (e.g., 0 wt. %).

The clad aluminum alloy layer can optionally comprise copper (Cu). In some aspects, the clad aluminum alloy layer can comprise up to about 1.0 wt. % Cu, e.g., up to about 0.95 wt. % Cu, up to about 0.90 wt. % Cu, up to about 0.85 wt. % Cu, up to about 0.80 wt. % Cu, up to about 0.75 wt. % Cu, up to about 0.70 wt. % Cu, up to about 0.65 wt. % Cu, up to about 0.60 wt. % Cu, up to about 0.55 wt. %, up to about 0.50 wt. % Cu, up to about 0.45 wt. % Cu, up to about 0.40 wt. % Cu, up to about 0.35 wt. % Cu, up to about 0.30 wt. % Cu, up to about 0.25 wt. % Cu, up to about 0.20 wt. % Cu, up to about 0.15 wt. % Cu, up to about 0.10 wt. % Cu, up to about 0.05 wt. % Cu, up to about 0.04 wt. % Cu, up to about 0.03 wt. % Cu, up to about 0.02 wt. % Cu, or up to about 0.01 wt. % Cu. In terms of ranges, the clad layer can optionally comprise from about 0.01 wt. % to about 1.0 wt. % Cu, e.g., from about 0.03 wt. % to about 0.80 wt. % Cu, from about 0.03 wt. % to about 0.30 wt. % Cu, from about 0.03 wt. % to about 0.10 wt. % Cu, from about 0.05 wt. % to about 0.6 wt. % Cu, from about 0.1 wt. % to about 0.6 wt. % Cu, or from about 0.5 wt. % to about 0.6 wt. % Cu. In some embodiments, Cu is not present (e.g., 0 wt. %).

The clad aluminum alloy layer can optionally comprise manganese (Mn). In some aspects, the clad aluminum alloy layer can comprise up to about 0.5 wt. % Mn, e.g., up to about 0.45 wt. % Mn, up to about 0.40 wt. % Mn, up to about 0.35 wt. % Mn, up to about 0.30 wt. % Mn, up to about 0.25 wt. % Mn, up to about 0.20 wt. % Mn, up to about 0.15 wt. % Mn, up to about 0.10 wt. % Mn, up to about 0.05 wt. % Mn, up to about 0.04 wt. % Mn, up to about 0.03 wt. % Mn, up to about 0.02 wt. % Mn, or up to about 0.01 wt. % Mn. In terms of ranges, the clad layer can optionally comprise from about 0.01 wt. % to about 0.5 wt. % Mn, e.g., from about 0.03 wt. % to about 0.40 wt. % Mn, from about 0.03 wt. % to about 0.30 wt. % Mn, from about 0.03 wt. % to about 0.25 wt. % Mn, from about 0.04 wt. % to about 0.20 wt. % Mn, or from about 0.10 wt. % to about 0.20 wt. % Mn. In some embodiments, Mn is not present (e.g., 0 wt. %).

The clad aluminum alloy layer can optionally comprise titanium (Ti). In some aspects, the clad aluminum alloy layer can comprise up to about 0.5 wt. % Ti, e.g., up to about 0.45 wt. % Ti, up to about 0.40 wt. % Ti, up to about 0.35 wt. % Ti, up to about 0.30 wt. % Ti, up to about 0.25 wt. % Ti, up to about 0.20 wt. % Ti, up to about 0.15 wt. % Ti, up to about 0.12 wt. % Ti, up to about 0.10 wt. % Ti, up to about 0.05 wt. % Ti, up to about 0.03 wt. % Ti, up to about 0.02 wt. % Ti, or up to about 0.01 wt. % Ti. In terms of ranges, the clad layer can optionally comprise from about 0.01 wt. % to about 0.5 wt. % Ti, e.g., from about 0.03 wt. % to about 0.40 wt. % Ti, from about 0.05 wt. % to about 0.30 wt. % Ti, from about 0.05 wt. % to about 0.25 wt. % Ti, from about 0.07 wt. % to about 0.20 wt. % Ti, or from about 0.08 wt. % to about 0.15 wt. % Ti. In some embodiments, Ti is not present (e.g., 0 wt. %).

The clad aluminum alloy layer can optionally comprise vanadium (V). In some aspects, the clad aluminum alloy layer can comprise up to about 0.3 wt. % V, e.g., up to about 0.25 wt. % V, up to about 0.20 wt. % V, up to about 0.15 wt. % V, up to about 0.10 wt. % V, up to about 0.08 wt. % V, up to about 0.05 wt. % V, up to about 0.03 wt. % V, up to about 0.02 wt. % V, or up to about 0.01 wt. % V. In terms of ranges, the clad layer can optionally comprise from about 0.01 wt. % to about 0.30 wt. % V, e.g., from about 0.01 wt. % to about 0.30 wt. % V, from about 0.03 wt. % to about 0.30 wt. % V, from about 0.05 wt. % to about 0.25 wt. % V, from about 0.06 wt. % to about 0.25 wt. % V, from about 0.07 wt. % to about 0.20 wt. % V, or from about 0.08 wt. % to about 0.15 wt. % V. In some embodiments, V is not present (e.g., 0 wt. %).

Optionally, the clad aluminum alloy layer described herein can further include other minor elements, sometimes referred to as impurities, in amounts of about 0.05 wt. % or below, about 0.04 wt. % or below, about 0.03 wt. % or below, about 0.02 wt. % or below, or about 0.01 wt. % or below. These impurities may include, but are not limited to, V, Ni, Sc, Hf, Zr, Sn, Ga, Bi, Na, Pb, or combinations thereof. Accordingly, V, Ni, Sc, Hf, Zr, Sn, Ga, Bi, Na, or Pb, may each be present in alloys in amounts of about 0.05 wt. % or less, about 0.04 wt. % or less, about 0.03 wt. % or less, about 0.02 wt. % or less, or about 0.01 wt. % or less, for example. The sum of all impurities does not exceed about 0.50 wt. % (e.g., does not exceed about 0.40 wt. %, about 0.30 wt. %, about 0.25 wt. %, about 0.20 wt. % about 0.15 wt. %, or about 0.10 wt. %). All expressed in wt. %. In some aspects, the remaining percentage of the alloy is aluminum.

In some aspects, Ca, Mg, and/or Zn can be alloyed with any appropriate series alloy to produce the clad layers described herein. By way of a non-limiting example, Ca can be combined with the other components of a 1xxx series alloy (including Fe) to form the clad aluminum alloy layer, such as AA1100, AA1100A, AA1200, AA1200A, AA1300, AA1110, AA1120, AA1230, AA1230A, AA1235, AA1435, AA1145, AA1345, AA1445, AA1150, AA1350, AA1350A, AA1450, AA1370, AA1275, AA1185, AA1285, AA1385, AA1188, AA1190, AA1290, AA1193, AA1198, or AA1199. As another non-limiting example, Ca can be combined with the other components of a 7xxx series alloy (including Zn) to form the clad aluminum alloy layer, such as 7xxx series alloys: AA7011, AA7019, AA7020, AA7021, AA7039, AA7072, AA7075, AA7085, AA7108, AA7108A, AA7015, AA7017, AA7018, AA7019A, AA7024, AA7025, AA7028, AA7030, AA7031, AA7033, AA7035, AA7035A, AA7046, AA7046A, AA7003, AA7004, AA7005, AA7009, AA7010, AA7011, AA7012, AA7014, AA7016, AA7116, AA7122, AA7023, AA7026, AA7029, AA7129, AA7229, AA7032, AA7033, AA7034, AA7036, AA7136, AA7037, AA7040, AA7140, AA7041, AA7049, AA7049A, AA7149, AA7204, AA7249, AA7349, AA7449, AA7050, AA7050A, AA7150, AA7250, AA7055, AA7155, AA7255, AA7056, AA7060, AA7064, AA7065, AA7068, AA7168, AA7175, AA7475, AA7076, AA7178, AA7278, AA7278A, AA7081, AA7181, AA7185, AA7090, AA7093, AA7095, and AA7099. As another non-limiting example, Ca can be combined with the other components of an 8xxx series alloy (including Fe) to form the clad aluminum alloy layer, such as AA8006, AA8008, AA8010, AA8112, AA8014, AA8015, AA8016, AA8021, AA8023, AA8026, AA8030, AA8130, AA8150, AA8076, AA8076A, and AA8177.

In another non-limiting example, due to the increased corrosion resistance provided by the aluminum alloys and coated aluminum alloys described, increased levels of alloying elements that are traditionally associated with increased corrosion, e.g., Cu, can be included and used in products, such as clad products. One example is a high Cu 6xxx series aluminum alloy. For example, the aluminum alloys described can contain up to 1.0 wt. % Cu (e.g., up to about 0.95 wt. % Cu, up to about 0.90 wt. % Cu, up to about 0.85 wt. % Cu, up to about 0.80 wt. % Cu, up to about 0.75 wt. % Cu, up to about 0.70 wt. % Cu, up to about 0.65 wt. % Cu, up to about 0.60 wt. % Cu, up to about 0.55 wt. %, up to about 0.50 wt. % Cu, up to about 0.45 wt. % Cu, up to about 0.40 wt. % Cu, up to about 0.35 wt. % Cu, up to about 0.30 wt. % Cu, up to about 0.25 wt. % Cu, up to about 0.20 wt. % Cu, up to about 0.15 wt. % Cu, up to about 0.10 wt. % Cu, from 0.1 wt. % to 1.0 wt. % Cu, from 0.2 wt. % to 0.9 wt. % Cu, from 0.3 wt. % to 0.8 wt. % Cu, from 0.4 wt. % to 0.7 wt. % Cu, or from 0.5 wt. % to 0.6 wt. %. In some embodiments, Cu is not present (e.g., 0 wt. %). Typically manufacturers have been reluctant to use such materials due to potential filiform corrosion issues. The increased corrosion resistance of the aluminum alloys and coated aluminum alloys described make possible the use of new alloys like a high Cu 6xxx series aluminum alloy.

In some examples, an alloy for use as a clad layer can have the following elemental composition as provided in Table 1.

TABLE 1

| Element | Weight Percentage (wt. %) |
|---------|---------------------------|
| Zn | 0.01 to 3.0 |
| Ca | 0.01 to 1.0 |
| Si | Up to 5.0 |
| Mn | Up to 0.50 |
| Fe | Up to 1.0 |
| Cu | Up to 1.0 |
| Ti | Up to 0.50 |
| V | Up to 0.30 |
| Impurities | Up to 0.25 |
| Al | Remainder |

As another example, an alloy for use as a clad layer can have the following elemental composition as provided in Table 2.

TABLE 2

| Element | Weight Percentage (wt. %) |
|---------|---------------------------|
| Zn | 0.01 to 3.0 |
| Mg | 0.01 to 1.0 |
| Si | Up to 5.0 |
| Mn | Up to 0.50 |
| Fe | Up to 1.0 |
| Cu | Up to 1.0 |
| Ti | Up to 0.50 |
| V | Up to 0.30 |
| Impurities | Up to 0.25 |
| Al | Remainder |

As another example, an alloy for use as a clad layer can have the following elemental composition as provided in Table 3.

TABLE 3

| Element | Weight Percentage (wt. %) |
|---------|---------------------------|
| Zn | 0.01 to 3.0 |
| Ca | 0.01 to 1.0 |
| Mg | 0.01 to 1.0 |
| Si | Up to 5.0 |
| Mn | Up to 0.50 |
| Fe | Up to 1.0 |
| Cu | Up to 1.0 |

TABLE 3-continued

| Element | Weight Percentage (wt. %) |
|---|---|
| Ti | Up to 0.50 |
| V | Up to 0.30 |
| Impurities | Up to 0.25 |
| Al | Remainder |

As described above, the clad aluminum alloy products can contain one clad layer or more than one clad layer. In some cases, the clad aluminum alloy products contain only a first clad layer. In some cases, the clad aluminum alloy products contain a first clad layer and a second clad layer.

In some cases, the first clad layer and the second clad layer are identical in composition. In other cases, the first clad layer and the second clad layer differ in composition. The resulting clad aluminum alloy products exhibit excellent balanced properties, such as strength, formability, corrosion resistance, dent resistance, and hemming performance.

In some cases, the first clad layer can have a thickness of about 1% to 25% of the total clad product thickness (e.g., from about 1% to about 12% of the total clad product thickness or about 10% of the total clad product thickness). In some cases, where a second clad layer is present, the second clad layer can have a thickness of about 1% to 25% of the total clad product thickness (e.g., from about 1% to about 12% of the total clad product thickness or about 10% of the total clad product thickness).

Clad layers as described herein can improve surface corrosion resistance properties of the products, improve pretreatment efficiency, aid bending, riveting hole piercing and clinching, and can make the alloy product usable in T4 temper for some parts without hot forming. Moreover, when a filler wire alloy, such as AA7021, is used as the clad layer, laser welding can be accomplished without using filler wire.

Methods of Producing the Aluminum Alloys, Coated Aluminum Alloys and Clad Aluminum Alloy Products The alloys described herein for use as the core and clad layers can be cast using any suitable casting method. As a few non-limiting examples, the casting process can include a direct chill (DC) casting process or a continuous casting (CC) process.

A clad layer as described herein can be attached to a core layer as described herein to form a clad aluminum alloy product by any means known to persons of ordinary skill in the art. For example, a clad layer can be attached to a core layer by direct chill co-casting (i.e., fusion casting) as described in, for example, U.S. Pat. Nos. 7,748,434 and 8,927,113, both of which are hereby incorporated by reference in their entireties; by hot and cold rolling a composite cast ingot as described in U.S. Pat. No. 7,472,740, which is hereby incorporated by reference in its entirety; or by roll bonding to achieve the required metallurgical bonding between the core and the clad layer; or by other methods as known to persons of ordinary skill in the art. The initial dimensions and final dimensions of the clad aluminum alloy products described herein can be determined by the desired properties of the overall final product.

The roll bonding process can be carried out in different manners. For example, the roll-bonding process can include both hot rolling and cold rolling. Further, the roll bonding process can be a one-step process or a multi-step process in which the material is gauged down during successive rolling steps. Separate rolling steps can optionally be separated by other processing steps, including, for example, annealing steps, cleaning steps, heating steps, cooling steps, and the like.

The co-cast ingot or other cast product can be processed by any means known to those of ordinary skill in the art. Optionally, the processing steps can be used to prepare sheets. Such processing steps include, but are not limited to, homogenization, hot rolling, cold rolling, solution heat treatment, and an optional pre-aging step, as known to those of ordinary skill in the art.

In the homogenization step of a DC casting process, the co-cast ingot described herein is heated to a temperature ranging from about 400° C. to about 500° C., or any suitable temperature. For example, the ingot can be heated to a temperature of about 400° C., about 410° C., about 420° C., about 430° C., about 440° C., about 450° C., about 460° C., about 470° C., about 480° C., about 490° C., or about 500° C. The ingot is then allowed to soak (i.e., held at the indicated temperature) for a period of time. In some examples, the total time for the homogenization step, including the heating and soaking phases, can be up to 24 hours. For example, the ingot can be heated up to 500° C. and soaked, for a total time of up to 18 hours for the homogenization step. Optionally, the ingot can be heated to below 490° C. and soaked, for a total time of greater than 18 hours for the homogenization step. In some cases, the homogenization step comprises multiple processes. In some non-limiting examples, the homogenization step includes heating the ingot to a first temperature for a first period of time followed by heating to a second temperature for a second period of time. For example, the ingot can be heated to about 465° C. for about 3.5 hours and then heated to about 480° C. for about 6 hours.

Following the homogenization step of the co-cast ingot, a hot rolling step can be performed. Prior to the start of hot rolling, the homogenized ingot can be allowed to cool to a temperature, such as from about 300° C. to about 450° C. For example, the homogenized ingot can be allowed to cool to a temperature of from about 325° C. to about 425° C. or from about 350° C. to about 400° C. The ingots can then be hot rolled at a temperature between 300° C. to 450° C. to form a hot rolled plate, a hot rolled shate or a hot rolled sheet having a gauge of from about 3 mm to about 200 mm (e.g., 3 mm, 4 mm, 5 mm, 6 mm, 7 mm, 8 mm, 9 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 110 mm, 120 mm, 130 mm, 140 mm, 150 mm, 160 mm, 170 mm, 180 mm, 190 mm, 200 mm, or anywhere in between).

Optionally, the cast product can be a continuously cast product that can be allowed to cool after a high temperature continuous casting step to a temperature such as from about 300° C. to about 450° C. For example, the continuously cast product can be allowed to cool to a temperature of from about 325° C. to about 425° C. or from about 350° C. to about 400° C. The continuously cast product can then be hot rolled at a temperature of from about 300° C. to about 450° C. to form a hot rolled plate, a hot rolled shate or a hot rolled sheet having a gauge of from about 3 mm to about 200 mm (e.g., 3 mm, 4 mm, 5 mm, 6 mm, 7 mm, 8 mm, 9 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 110 mm, 120 mm, 130 mm, 140 mm, 150 mm, 160 mm, 170 mm, 180 mm, 190 mm, 200 mm, or anywhere in between). During hot rolling, temperatures and other operating parameters can be controlled so that the temperature of the clad alloy hot rolled product upon exit from the hot rolling mill is no more than about 470° C., no more than about 450° C., no more than about 440° C., or no more than about 430° C.

The clad plate, shate, or sheet can then be cold rolled using conventional cold rolling mills and technology. Optionally, the cold rolled clad product (e.g., sheet or shate) can have a gauge of from about 0.5 mm to about 10 mm, e.g., between about 0.7 mm to about 6.5 mm. Optionally, the cold rolled clad sheet can have a gauge of 0.5 mm, 1.0 mm, 1.5 mm, 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, or 10.0 mm. The cold rolling can be performed to result in a final gauge thickness that represents a gauge reduction of up to about 85% (e.g., up to about 10%, up to about 20%, up to about 30%, up to about 40%, up to about 50%, up to about 60%, up to about 70%, up to about 80%, or up to about 85% reduction). Optionally, an interannealing step can be performed during the cold rolling step. The interannealing step can be performed at a temperature such as from about 300° C. to about 450° C. (e.g., about 310° C., about 320° C., about 330° C., about 340° C., about 350° C., about 360° C., about 370° C., about 380° C., about 390° C., about 400° C., about 410° C., about 420° C., about 430° C., about 440° C., or about 450° C.). In some cases, the interannealing step comprises multiple processes. In some non-limiting examples, the interannealing step includes heating the cold rolled clad plate, shate, or sheet to a first temperature for a first period of time followed by heating to a second temperature for a second period of time. For example, the cold rolled clad plate, shate, or sheet can be heated to about 410° C. for about 1 hour and then heated to about 330° C. for about 2 hours.

Subsequently, the clad plate, shate, or sheet can undergo a solution heat treatment step. The solution heat treatment step can include any conventional treatment for the clad sheet which results in solutionizing of the soluble particles. The clad plate, shate, or sheet can be heated to a peak metal temperature (PMT) of up to, for example, about 590° C. (e.g., from about 400° C. to about 590° C.) and soaked for a period of time at the temperature. For example, the clad plate, shate, or sheet can be soaked at about 480° C. for a soak time of up to about 30 minutes (e.g., 0 seconds, about 60 seconds, about 75 seconds, about 90 seconds, about 5 minutes, about 10 minutes, about 20 minutes, about 25 minutes, or about 30 minutes). After heating and soaking, the clad plate, shate, or sheet is rapidly cooled at rates greater than 50° C./second (° C./s) to a temperature from about 500° C. to about 200° C. In one example, the clad plate, shate, or sheet is cooled at a quench rate of above 200° C./s from a temperature of about 450° C. to a temperature of about 200° C. Optionally, the cooling rates can be faster in other cases.

After quenching, the clad plate, shate or sheet can optionally undergo a pre-aging treatment by reheating the plate, shate, or sheet before coiling. The pre-aging treatment can be performed at a temperature such as from about 50° C. to about 150° C. for a period of time such as up to about 6 hours. For example, the pre-aging treatment can be performed at a temperature of about 50° C., about 55° C., about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., or about 150° C. Optionally, the pre-aging treatment can be performed for about 30 minutes, about 1 hour, about 2 hours, about 3 hours, about 4 hours, about 5 hours, or about 6 hours. The pre-aging treatment can be carried out by passing the plate, shate, or sheet through a heating device, such as a device that emits radiant heat, convective heat, induction heat, infrared heat, or the like.

The co-cast ingots or other co-cast products described herein can also be used to make products in the form of plates or other suitable products. The products can be made using techniques as known to those of ordinary skill in the art. For example, plates including the clad products as described herein can be prepared by processing a co-cast ingot in a homogenization step or casting a co-cast product in a continuous caster followed by a hot rolling step. In the hot rolling step, the cast product can be hot rolled to a 200 mm thick gauge or less (e.g., from about 10 mm to about 200 mm). For example, the cast product can be hot rolled to a plate having a final gauge thickness of about 10 mm to about 175 mm, about 15 mm to about 150 mm, about 20 mm to about 125 mm, about 25 mm to about 100 mm, about 30 mm to about 75 mm, or about 35 mm to about 50 mm.

Properties of Clad Aluminum Alloy Products

The clad aluminum alloy products described herein can be designed to achieve any desired strength level as determined by persons of ordinary skill in the art. For example, the clad aluminum alloy products described herein can have yield strengths of up to about 600 MPa (e.g., from about 150 MPa to about 600 MPa, from about 450 MPa to about 600 MPa, or from about 500 MPa to about 600 MPa). In some examples, the yield strengths of the products can be about 400 MPa, about 425 MPa, about 450 MPa, about 475 MPa, about 500 MPa, about 525 MPa, about 550 MPa, about 575 MPa, or about 600 MPa.

In addition, the clad aluminum alloy products described herein can have elongations of up to about 50%. For example, the elongations can be about 45%, about 40%, about 35%, about 30%, about 25%, about 20%, about 15%, about 10% or about 5%.

Further, the clad aluminum alloy products described herein can have strong bendability properties. A bend angle of from about 45° to about 120° can be achieved, based on the desired use of the product, as measured by a three-point bend test according to VDA Standard 238-100, normalized to 2.0 mm. For example, the clad aluminum alloy products described herein can achieve a bend angle of about 45°, about 50°, about 55°, about 60°, about 65°, about 70°, about 75°, about 80°, about 85°, about 90°, about 95°, about 100°, about 105°, about 110°, about 115°, or about 120°.

In some examples, a clad aluminum alloy product (e.g., a clad aluminum alloy sheet) made according to a method described herein can have a minimum R/t ratio (i.e., f-factor) of about 1.2 without cracking. The R/t ratio can provide an assessment of the bendability of a material. As described below, the bendability is assessed based on the R/t ratio, where R is the radius of the tool (die) used and t is the thickness of the material. A lower R/t ratio indicates better bendability of the material. The R/t ratio of the clad aluminum alloy layers described herein can be about 1.1 or lower (e.g., about 1.0 or lower, about 0.9 or lower, about 0.8 or lower, or about 0.7 or lower).

Methods of Using the Clad Aluminum Alloy Products

The clad aluminum alloy products described herein can be used in automotive applications and other transportation applications, including aircraft and railway applications. For example, the clad aluminum alloy products can be used to prepare automotive structural parts, such as bumpers, side beams, roof beams, cross beams, pillar reinforcements (e.g., A-pillars, B-pillars, and C-pillars), inner panels, outer panels, side panels, inner hoods, outer hoods, or trunk lid panels. The clad aluminum alloy products and methods described herein can also be used in aircraft or railway vehicle applications, to prepare, for example, external and internal panels. In some examples, the clad aluminum alloy products can be used in aerospace structural and non-structural parts or in marine structural or non-structural parts.

The clad aluminum alloy products and methods described herein can also be used in electronics applications. For example, the clad aluminum alloy products and methods described herein can be used to prepare housings for electronic devices, including mobile phones and tablet computers. In some examples, the clad aluminum alloy products can be used to prepare housings for the outer casings of mobile phones (e.g., smart phones) and tablet bottom chassis.

The clad aluminum alloy products and methods described herein can also be used in other applications as desired. The clad aluminum alloy products described herein can be provided as clad aluminum alloy sheets and/or clad aluminum alloy plates suitable for further processing by an end user. For example, a clad aluminum alloy sheet can be further subjected to surface treatments by an end user for use as an architectural skin panel for aesthetic and structural purposes.

The clad aluminum alloy products described herein can also be joined to other materials to form useful products. Methods for joining the clad alloy products to other materials can include, but are not limited to, resistance spot welding (RSW), friction stir welding, remote laser welding, metal inert gas (MIG) welding, tungsten inert gas (TIG) welding, adhesive bonding, and self-piercing riveting. The alloy products can be used in a variety of applications, including automotive, transportation, electronics, and other applications.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention. During the studies described in the following examples, conventional procedures were followed, unless otherwise stated. Some of the procedures are described below for illustrative purposes.

Examples

Clad Aluminum Alloy Layers

Clad aluminum alloy layers were produced by casting, hot and cold rolling, annealing above a temperature of 500° C., and quenching the alloys described in Table 4.

As shown in Table 4, Comparative Alloys 1, 2, and 3 were prepared as comparatives to Example Alloy 1 which has a similar composition as Comparative Alloys 1, 2, and 3, but also a combination of Ca (0.25 wt. %) and higher Zn (0.45 wt. %). Comparative Alloys 4 and 5 were prepared as comparatives to Example Alloy 2, which has a similar composition as Alloys 4 and 5, but also has a combination of Ca (0.54 wt. %) and higher Zn (0.95 wt. %).

TABLE 4

| | Clad Layer (wt. %) | | | | | | |
|---|---|---|---|---|---|---|---|
| Element | Comp Alloy 1 | Comp Alloy 2 | Comp Alloy 3 | Ex. Alloy 1 | Comp Alloy 4 | Comp Alloy 5 | Ex. Alloy 2 |
| Ca | — | 0.28 | — | 0.25 | 0.54 | — | 0.54 |
| Zn | 0.074 | 0.075 | 0.075 | 0.45 | 0.004 | 0.006 | 0.95 |
| Si | 0.077 | 0.079 | 0.076 | 0.075 | 0.055 | 0.042 | 0.047 |
| Fe | 0.45 | 0.47 | 0.61 | 0.49 | 0.091 | 0.095 | 0.087 |

TABLE 4-continued

| | Clad Layer (wt. %) | | | | | | |
|---|---|---|---|---|---|---|---|
| Element | Comp Alloy 1 | Comp Alloy 2 | Comp Alloy 3 | Ex. Alloy 1 | Comp Alloy 4 | Comp Alloy 5 | Ex. Alloy 2 |
| Mn | 0.16 | 0.17 | 0.22 | 0.16 | — | — | — |
| Ti | 0.1 | 0.10 | 0.13 | 0.10 | — | — | — |
| V | 0.067 | 0.068 | 0.084 | 0.077 | — | — | — |
| Sr | — | — | 0.75 | — | — | 1.73 | — |

All numbers are expressed in wt. %. Each composition contains up to 0.25 wt. % impurities. The remainder is Al.

Clad Aluminum Alloy Strength Properties

Figure 2:
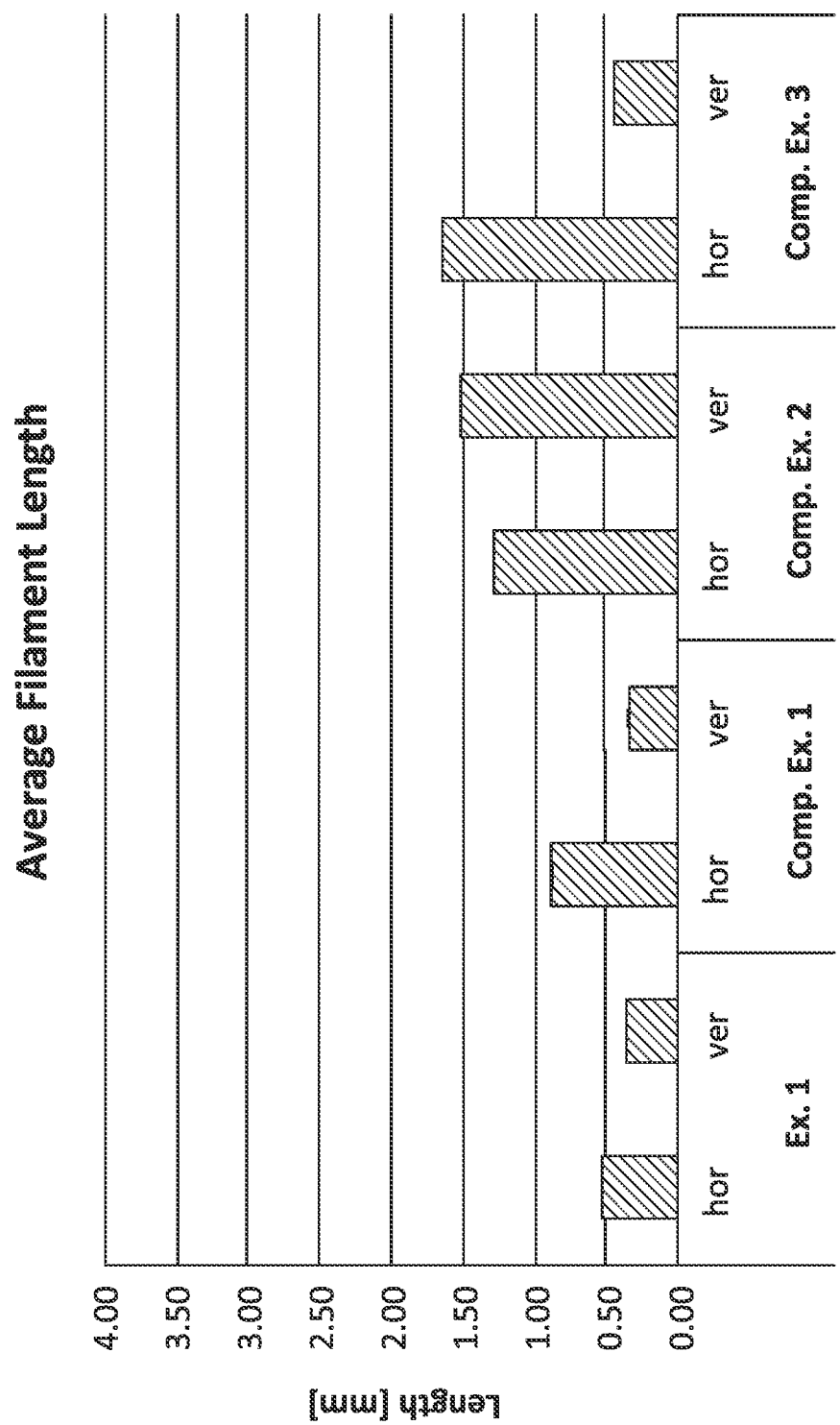
FIG. 2 is a graph of average filament length results from filiform corrosion testing for clad aluminum alloy layers.
Figure 3:
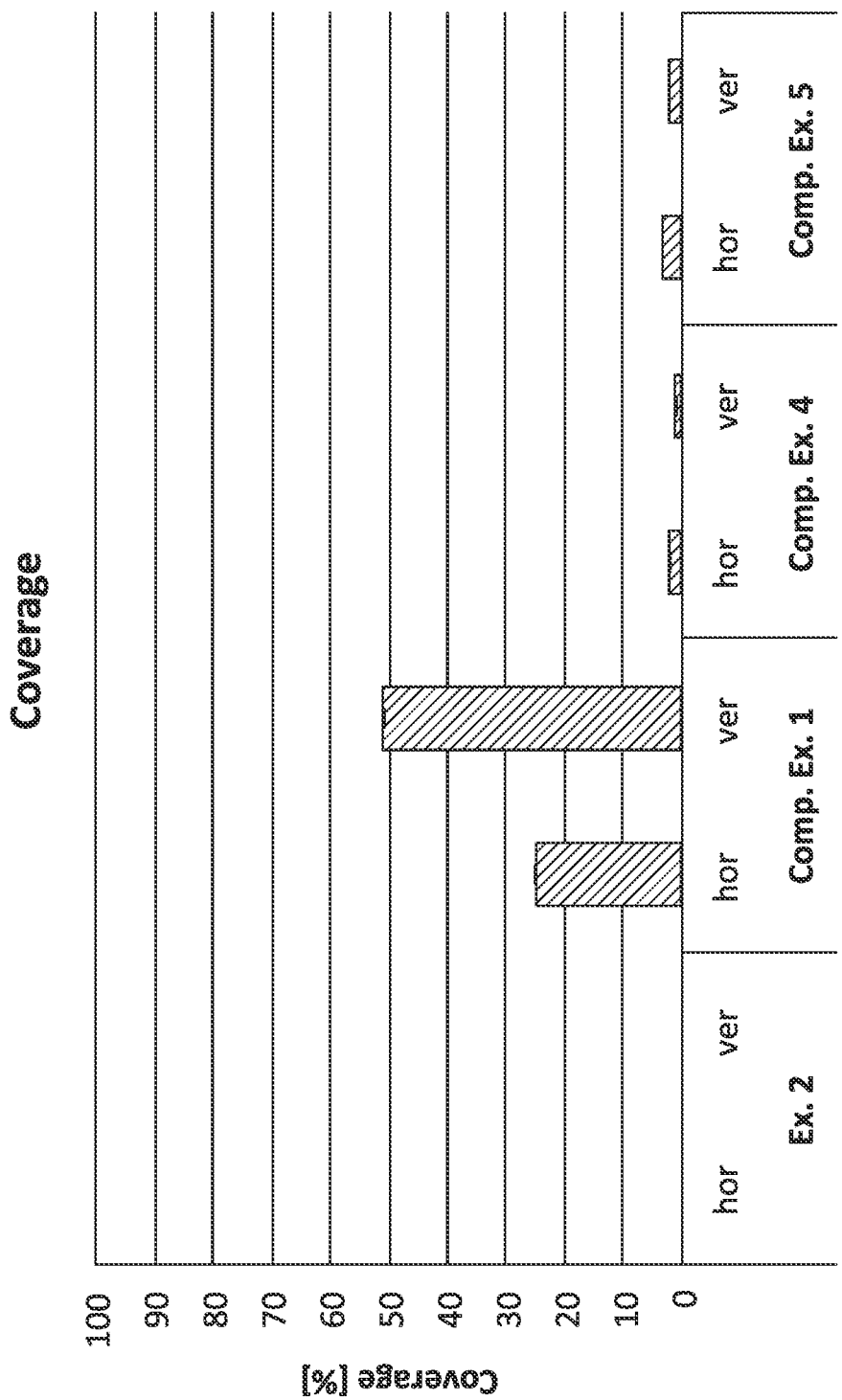
FIG. 3 is a graph of coverage results from filiform corrosion testing for clad aluminum alloy layers.
Figure 4:
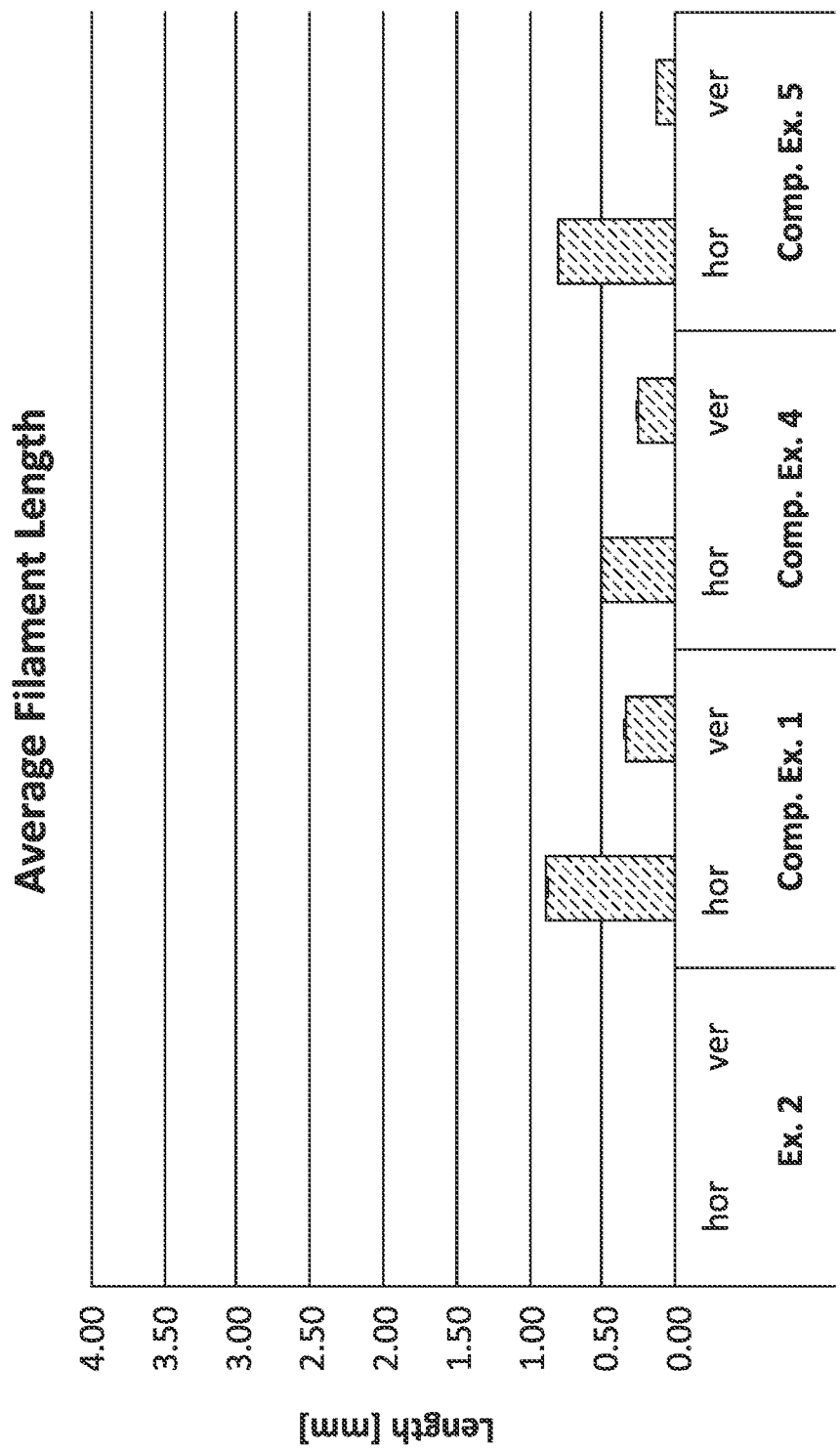
FIG. 4 is a graph of average filament length results from filiform corrosion testing for clad aluminum alloy layers.

The filiform corrosions of Comparative Alloys 1-5 and Example Alloys 1 and 2 were measured using ISO 4623-2 (2016). In addition, the phosphatability was measured for Comparative Alloy 1 and Example Alloys 1 and 2 using a classical 3 cation Zn-phosphate process. FIGS. 1-4 shows the filiform corrosion testing for the Comparative Alloys 1-5 and Example Alloys 1 and 2. As shown in FIG. 1 and FIG. 2, Example Alloy 1 shows exceptional filiform corrosion resistance against the comparatives. Example Alloy 1 gives the best filiform corrosion results in terms of the lowest coverage (%) in both the horizontal and vertical directions and the lowest average filament length in both the vertical and horizontal directions against the comparatives. Similarly, as can be seen in FIG. 3 and FIG. 4, Example Alloy 2 shows exceptional filiform corrosion resistance against its comparatives. Example Alloy 2 gives the best filiform corrosion results in terms of the lowest coverage (%) in both the horizontal and vertical directions and the lowest average filament length in both the vertical and horizontal directions against the comparatives.

Figure 5:
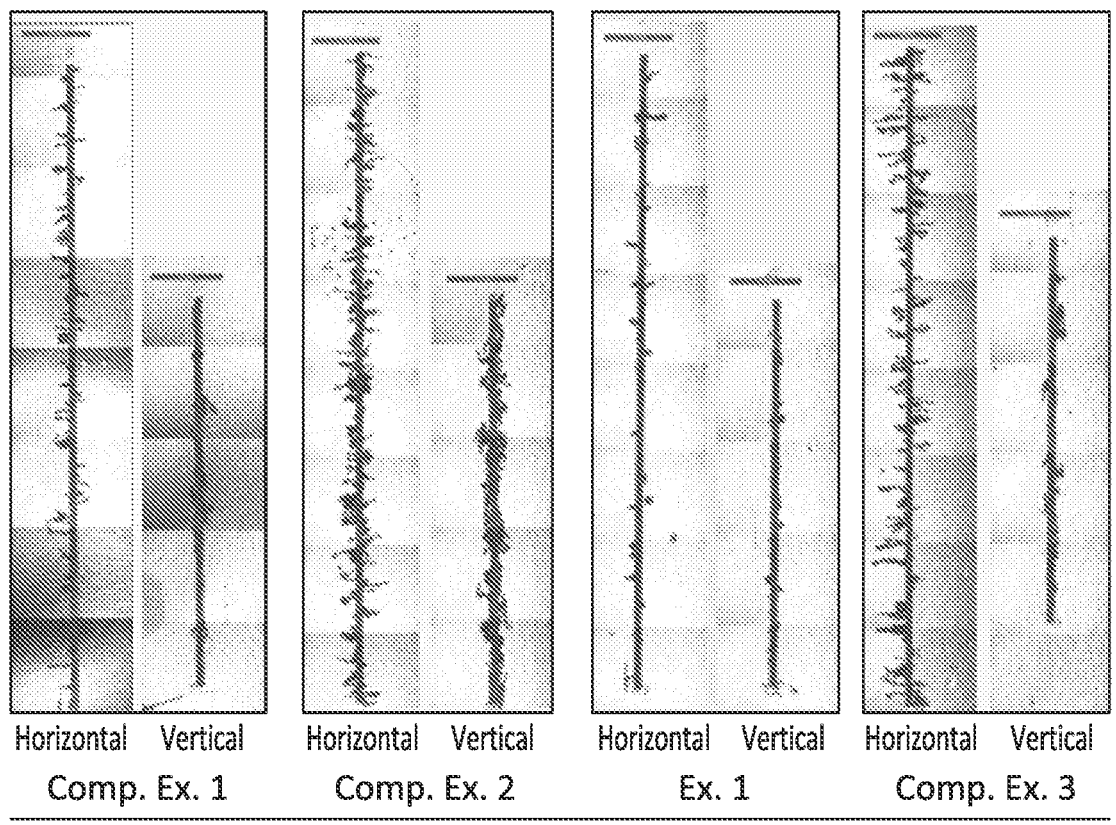
FIG. 5 is a micrograph showing microstructure for clad aluminum alloy layers after having undergone filiform corrosion testing.
Figure 6:
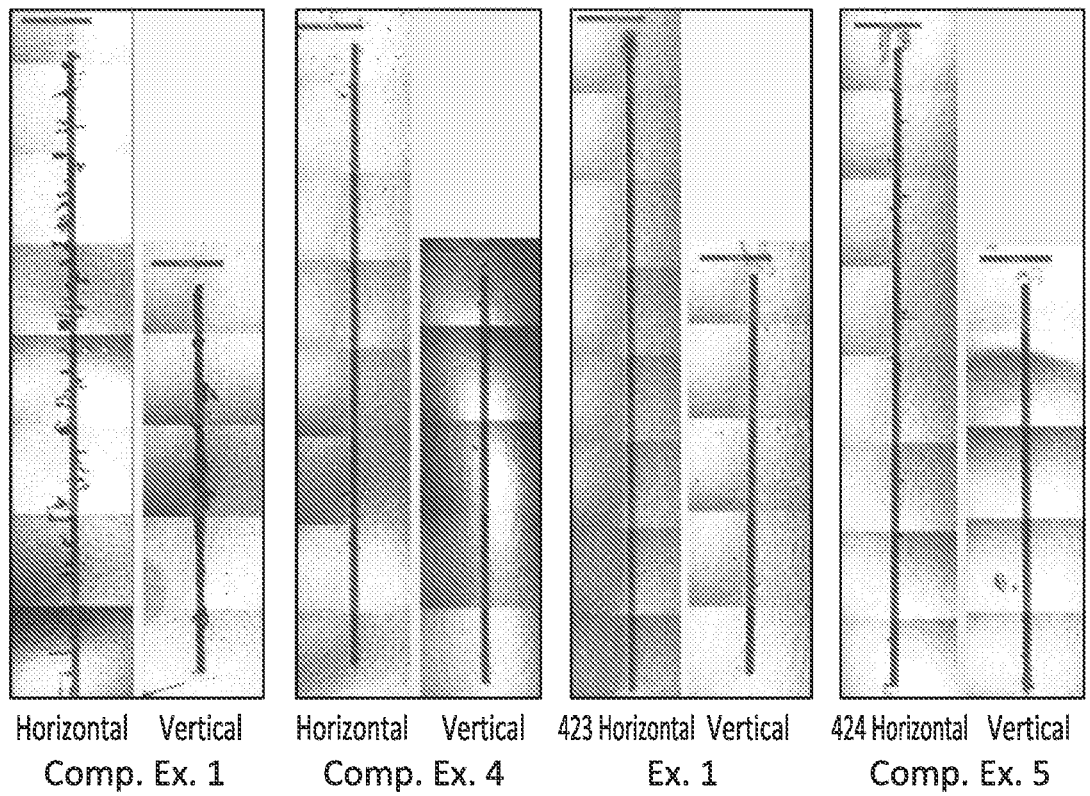
FIG. 6 is a micrograph showing microstructure for clad aluminum alloy layers after having undergone filiform corrosion testing.

FIG. 5 and FIG. 6 show the same results visually. FIG. 5 shows micrographs of the results of the filiform corrosion tests for Comparative Alloys 1-3 and Example Alloy 1. FIG. 6 shows micrographs of the results of the filiform corrosion tests for Comparative Alloys 4-5 and Example Alloy 2. As seen from FIG. 5 and FIG. 6, the filiform corrosion observed in the microstructures of the samples was significantly less for Example Alloys 1 and 2 than the Comparative Alloys.

Figure 7:
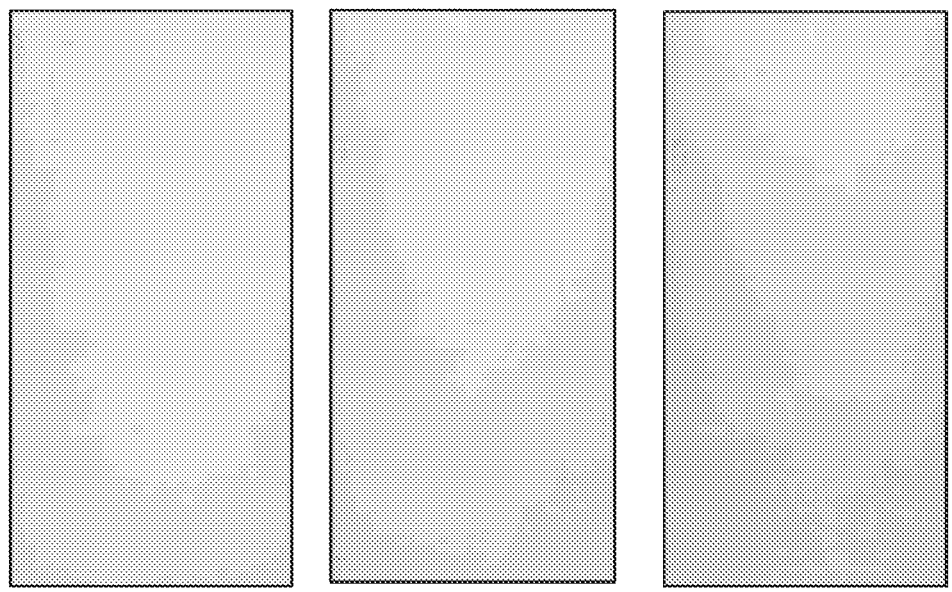
FIG. 7 is a digital image showing the results of phosphatability for clad aluminum alloy layers.

FIG. 7 shows the phosphatability of Comparative Alloy 1 and Example Alloys 1 and 2. As can be seen from the results in FIG. 7, the phosphatabilities of the 3 samples are comparable and are good. Ratings of the homogeneity of the phosphate crystals were determined using a scanning electronic microscope and ranged from 1-4. Coating weights were measured in $g/m^2$. Comparative Alloy 1 has a rating of 2-3 and a coating weight of 5.1 $g/m^2$. Example Alloy 1 had a rating of 2-3 and a coating weight of 4.7 $g/m^2$, comparable to Comparative Alloy 1. Example Alloy 2 had a rating of 3, again comparable to the other samples tested and coating weight was not measured.

Aluminum Alloys

Aluminum alloys were prepared with the compositions in Table 5. The bond durability performance of the aluminum alloys was measured using stress durability testing for adhesive joints. Bond durability testing assesses the strength of bonds created between the bonded products and may indicate the ability of the near-surface microstructures of an aluminum alloy product to strongly bind with the adhesive over long periods of use and under corrosive conditions or conditions that otherwise differ from ambient conditions. During testing, bonds are created between two aluminum alloy products, such as by an epoxy adhesive. Then, the bonded aluminum alloy products are subjected to strain and/or other conditions. For example, the bonded aluminum alloy products may be immersed in or sprayed with (e.g., according to the NSS test) a salt solution, subject to humid conditions, or drying conditions. After a series of cycles in one or more conditions, the bonds between the aluminum alloy products are evaluated for chemical and mechanical failure in an example using cycles. In other examples, the products are evaluated for chemical and mechanical failure after a single immersion or spray. The bond durability performance of an aluminum alloy product may indicate or be a function of the reactivity and corrosion sensitivity of the product's near-surface microstructures.

An example standard test for determining bond durability is ASTM D3433-99(2012) Standard Test Method for Fracture Strength in Cleavage of Adhesives in Bonded Metal Joints, ASTM International, West Conshohocken, PA, 2012, which is hereby incorporated by reference. During bond durability testing, each sample is made of two pieces of aluminum alloy product, prepared and treated using the same conditions, that are bonded together via six bonding sites using an epoxy adhesive. Next, each sample is subjected to various test conditions. For example, the test conditions may include one or more of immersion in a salt solution, exposure to humid conditions, exposure to dry conditions, or application of force inducing stress or strain. Each sample is subjected to numerous cycles of these test conditions. The number of cycles a sample is subjected to is either the number of cycles to reach mechanical failure or 60 cycles, the maximum number of cycles used in this particular test. Mechanical failure includes bond failure, a break in the metal product or a break in the adhesive. As such, the bonding surface may be associated with a wait period before being bonded to another surface, substrate, or product.

The example alloys were arranged in Table 5 in order of increasing stress durability performance with Example Alloy 7 having the highest stress durability performance.

TABLE 5

| Element | Ex. Alloy 3 | Ex. Alloy 4 | Ex. Alloy 5 | Ex. Alloy 6 | Ex. Alloy 7 |
|---|---|---|---|---|---|
| Si | 1.33 | 0.79 | 0.62 | 0.60 | 0.83 |
| Fe | 0.26 | 0.23 | 0.23 | 0.24 | 0.20 |
| Mn | 0.06 | 0.07 | 0.08 | 0.20 | 0.17 |
| Mg | 0.31 | 0.63 | 0.65 | 0.70 | 0.87 |
| Ti | 0.02 | 0.02 | 0.02 | 0.08 | 0.03 |
| Zn | 0.01 | 0.01 | 0.01 | 0.05 | 0.04 |
| Cr | 0.03 | 0.04 | 0.03 | 0.03-0.08 | 0.10 |

Aluminum Alloy Filiform Corrosion Testing

Additional aluminum alloys were produced by casting, hot and cold rolling, annealing above a temperature of 500° C., and quenching the alloy compositions described in Table 6.

TABLE 6

| Element | Comp. Ex. 6 | Ex. Alloy 8 | Ex. Alloy 9 | Ex. Alloy 10 | Ex. Alloy 11 |
|---|---|---|---|---|---|
| Si | 0.029 | 0.027 | 0.033 | 0.035 | 0.027 |
| Fe | 0.43 | 0.44 | 0.45 | 0.46 | 0.42 |
| Mn | 0.16 | 0.16 | 0.15 | 0.16 | 0.15 |
| Cr | — | — | 0.001 | — | — |
| Zn | 0.081 | 0.085 | 0.086 | 0.41 | 0.83 |
| Ti | — | — | 0.002 | — | 0.002 |

TABLE 6-continued

| Element | Comp. Ex. 6 | Ex. Alloy 8 | Ex. Alloy 9 | Ex. Alloy 10 | Ex. Alloy 11 |
|---|---|---|---|---|---|
| Ca | — | 0.26 | 0.51 | 0.27 | 0.51 |
| V | 0.012 | 0.012 | 0.012 | 0.011 | 0.011 |

All numbers are expressed in wt. %. All compositions contain up to 0.25 wt. % impurities. The remainder is Al.

Figure 8:
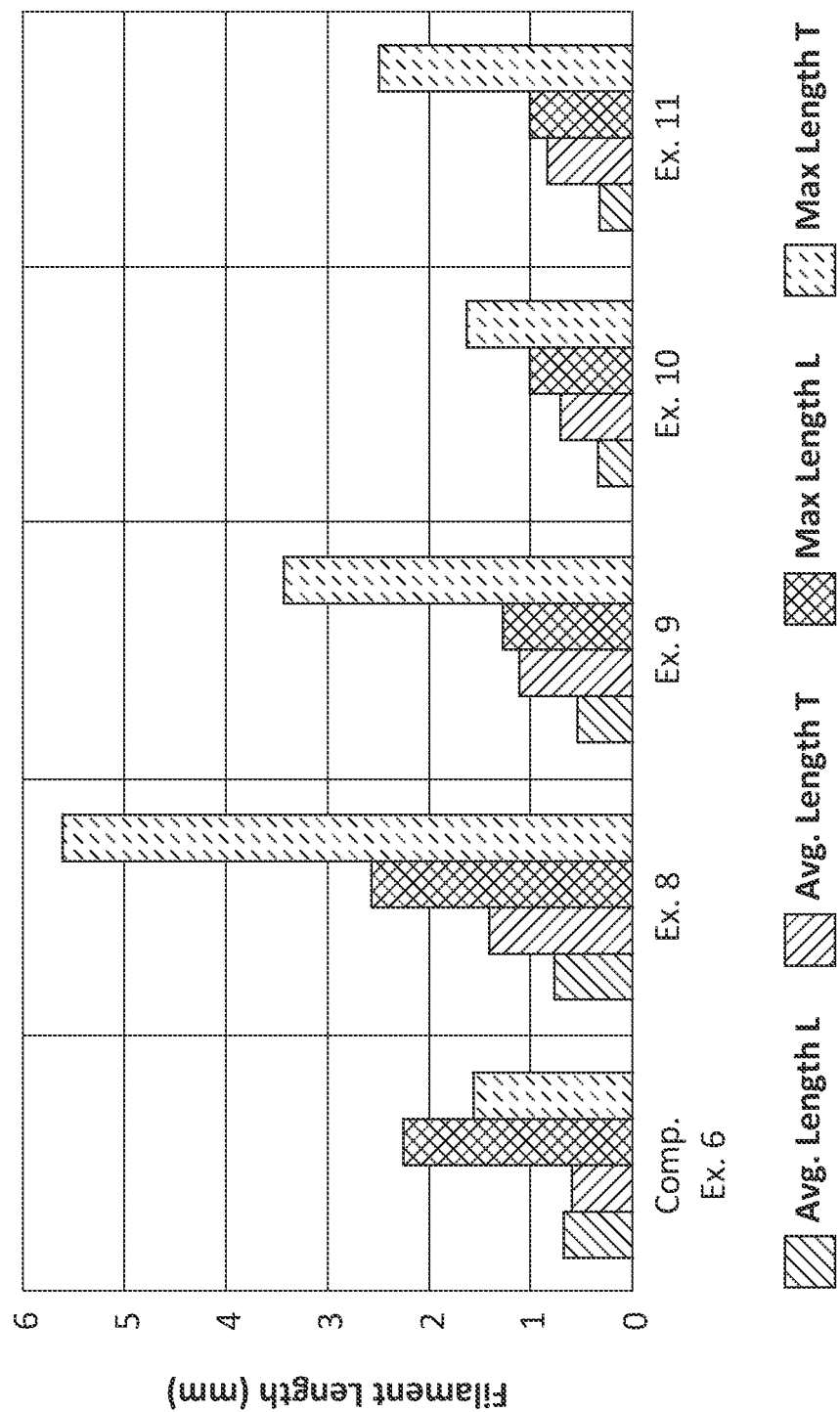
FIG. 8 is a graph of average and maximum filament length results from filiform corrosion testing for aluminum alloys.
Figure 9:
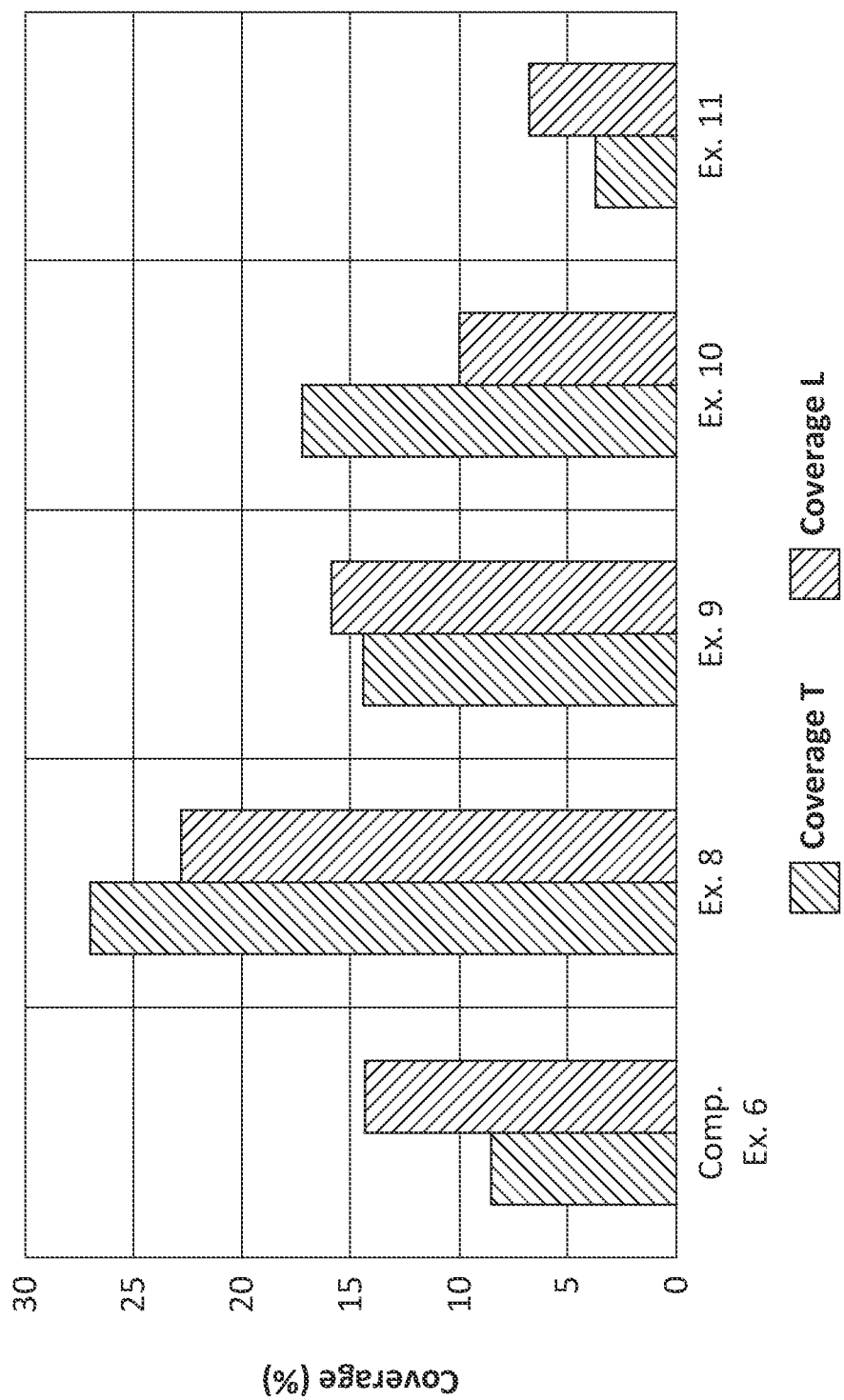
FIG. 9 is a graph of coverage results from filiform corrosion testing for aluminum alloys.

The filiform corrosions of Comparative Alloy 6 and Example Alloys 8-11 were measured using ISO 4623-2 (2016). The results of the filiform corrosion testing of Comparative Alloy 6 and Example Alloys 8-11 are shown in FIGS. 8 and 9. FIG. 8 shows the average and maximum filament lengths in both the vertical and horizontal directions. FIG. 9 shows the coverage (%) in both the horizontal and vertical directions.

Illustrations

As used below, any reference to a series of illustrations is to be understood as a reference to each of those illustrations disjunctively (e.g., "Illustrations 1-4" is to be understood as "Illustrations 1, 2, 3, or 4").

Illustration 1 is an aluminum alloy, comprising from about 0.01 wt. % to about 1.0 wt. % Ca; from about 0.01 wt. % to about 2.0 wt. % Zn; up to 5.0 wt. % Si; up to 1.0 wt. % Fe; up to 0.25 wt. % impurities; and Al.

Illustration 2 is an aluminum alloy, comprising from about 0.01 wt. % to about 5.0 wt. % Mg; from about 0.01 wt. % to about 8.0 wt. % Zn; up to 5.0 wt. % Si; up to 1.0 wt. % Fe; up to 0.25 wt. % impurities; and Al.

Illustration 3 is the aluminum alloy of any preceding or subsequent illustration, wherein the aluminum alloy is a clad layer.

Illustration 4 is the aluminum alloy of any preceding or subsequent illustration, wherein the Ca and Zn are present in a ratio of from about 1:5 to about 1:1 of Ca to Zn by weight.

Illustration 5 is the aluminum alloy of any preceding or subsequent illustration, wherein the Ca and Zn are present in a ratio of from about 1:3 to about 1:1.5 of Ca to Zn by weight.

Illustration 6 is the aluminum alloy of any preceding or subsequent illustration, further comprising from about 0.01 wt. % and about 0.9 wt. % Cu.

Illustration 7 is the aluminum alloy of any preceding or subsequent illustration, further comprising from about 0.5 wt. % and about 0.6 wt. % Cu.

Illustration 8 is the aluminum alloy of any preceding or subsequent illustration, further comprising from about 0.01 wt. % and about 0.5 wt. % Mn.

Illustration 9 is the aluminum alloy of any preceding or subsequent illustration, further comprising from about 0.01 wt. % to about 0.3 wt. % V.

Illustration 10 is the aluminum alloy of any preceding or subsequent illustration, comprising from about 0.2 wt. % to about 0.6 wt. % Ca, optionally from 0.3 wt. % to 0.6 wt. % Ca.

Illustration 11 is the aluminum alloy of any preceding or subsequent illustration, comprising from about 0.4 wt. % to about 1.0 wt. % Zn, optionally from 0.5 wt. % to 1.0 wt. %.

Illustration 12 is the aluminum alloy of any preceding or subsequent illustration, comprising from about 0.03 wt. % to about 0.10 wt. % Si.

Illustration 13 is the aluminum alloy of any preceding or subsequent illustration, comprising from about 0.08 wt. % to about 0.80 wt. % Fe.

Illustration 14 is the aluminum alloy of any preceding or subsequent illustration, having a coverage percent of 18% or less in each of the horizontal and vertical directions when tested according to filiform corrosion testing according to ISO 4623-2(2016).

Illustration 15 is the aluminum alloy of any preceding or subsequent illustration, having an average filament length during filiform corrosion testing of 0.50 mm or less in each of the horizontal and vertical directions as measured according to ISO 4623-2(2016).

Illustration 16 is an automotive structural part comprising the aluminum alloy of any preceding or subsequent illustration.

Illustration 17 is a coated aluminum alloy product, comprising an aluminum alloy substrate, a coating on a surface of the aluminum alloy substrate, the coating comprising Mg, Ca, Zn, Ni, or combinations thereof in an amount sufficient to prevent corrosion in the aluminum alloy substrate.

Illustration 18 is the coated aluminum alloy product of any preceding or subsequent illustration, wherein the coating on the surface of the aluminum alloy substrate is applied using a chemical wash physical vapor deposition ("PVD"), or chemical vapor deposition ("CVD").

Illustration 19 is the coated aluminum alloy product of any preceding or subsequent illustration, wherein the coated aluminum alloy product is a clad layer.

Illustration 20 is a clad aluminum alloy product, comprising a core layer having a first side and a second side; and a first clad layer in contact with the first side of the core layer, wherein the first clad layer comprises from about 0.01 wt. % to about 2.0 wt. % Zn, from about 0.1 wt. % to about 1.0 wt. % of Ca, and from about 0.1 wt. % to about 1.0 wt. % of Mg.

Illustration 21 is the clad aluminum alloy product of any preceding or subsequent illustration, wherein the Ca and Zn are present in the first clad layer at a ratio of from about 1:5 to about 1:1 of Ca to Zn by weight.

Illustration 22 is the clad aluminum alloy product of any preceding or subsequent illustration, wherein the first clad layer comprises from about 0.20 wt. % to about 0.60 wt. % Ca, optionally from 0.30 wt. % to 0.60 wt. % Ca.

Illustration 23 is the clad aluminum alloy product of any preceding or subsequent illustration, wherein the first clad layer comprises from between about 0.40 wt. % and about 1.0 wt. % Zn, optionally from 0.50 wt. % to 1.0 wt % Zn.

Illustration 24 is the clad aluminum alloy product of any preceding or subsequent illustration, wherein the first clad layer has a thickness of about 1 to 25% of a total thickness of the clad aluminum alloy product.

Illustration 25 is the clad aluminum alloy product of any preceding or subsequent illustration, wherein the core layer has a thickness of about 0.7 to 2.3 mm.

Illustration 26 is the clad aluminum alloy product of any preceding or subsequent illustration, further comprising a second clad layer located on the second side of the core layer.

Illustration 27 is the clad aluminum alloy product of any preceding or subsequent illustration, wherein the first clad layer and the second clad layer comprise the same alloys.

Illustration 28 is the clad aluminum alloy product of any preceding or subsequent illustration, wherein the first clad layer and the second clad layer comprise different alloys.

Illustration 29 is the clad aluminum alloy product of any preceding or subsequent illustration, wherein the second clad layer comprises between about 0.20 wt. % and about 0.60 wt. % Ca and between about 0.40 wt. % and about 1.0 wt. % Zn, optionally from 0.30 wt. % to 0.60 wt. % Ca and from 0.50 wt. % to 1.0 wt % Zn.

Illustration 30 is the clad aluminum alloy product of any preceding or subsequent illustration, wherein the core layer comprises a 1xxx series aluminum alloy, 2xxx series alloy, a 3xxx series aluminum alloy, a 4xxx series alloy, a 5xxx series aluminum alloy, a 6xxx series aluminum alloy, a 7xxx series aluminum alloy, or an 8xxx series aluminum alloy.

Illustration 31 is the clad aluminum alloy product of any preceding or subsequent illustration, wherein the core layer comprises a 5xxx series aluminum alloy, a 6xxx series aluminum alloy, or a 7xxx series aluminum alloy.

Illustration 32 is the clad aluminum alloy product of any preceding or subsequent illustration, wherein the clad aluminum alloy product has a yield strength of at least 550 MPa.

Illustration 33 is the clad aluminum alloy product of any preceding or subsequent illustration, wherein the clad aluminum alloy product has a total elongation up to 20%.

Illustration 34 is the clad aluminum alloy product of any preceding or subsequent illustration, wherein the clad aluminum alloy product is a sheet, a plate, an electronic device housing, an automotive structural part, an aerospace structural part, an aerospace non-structural part, a marine structural part, or a marine non-structural part.

All patents, publications and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention as defined in the following claims.

What is claimed is:

1. An aluminum alloy, comprising:
   from 0.01 wt. % to 1.0 wt. % Ca;
   from 0.01 wt. % to 2.0 wt. % Zn;
   from 0.01 wt. % to 0.25 wt. % Si;
   up to 1.0 wt. % Fe;
   from 0.01 wt. % to 0.3 wt. % V;
   up to 0.25 wt. % impurities; and
   Al; wherein the aluminum alloy has a coverage percent of 18% or less during filiform corrosion testing according to ISO 4623-2(2016); wherein the aluminum alloy is a clad layer.

2. The aluminum alloy of claim 1, wherein the Ca and Zn are present in a ratio of from 1:5 to 1:1 of Ca to Zn by weight.

3. The aluminum alloy of claim 1, further comprising from 0.01 wt. % to 0.9 wt. % Cu.

4. The aluminum alloy of claim 1, further comprising from 0.01 wt. % to 0.5 wt. % Mn.

5. The aluminum alloy of claim 1, comprising from 0.2 wt. % to 0.6 wt. % Ca.

6. The aluminum alloy of claim 1, comprising from 0.4 wt. % to 1.0 wt. % Zn.

7. The aluminum alloy of claim 1, comprising from 0.03 wt. % to 0.10 wt. % Si.

8. The aluminum alloy of claim 1, comprising from 0.08 wt. % to 0.80 wt. % Fe.

9. The aluminum alloy of claim 1, having an average filament length during filiform corrosion testing of 0.50 mm or less in each of the horizontal and vertical directions as measured according to ISO 4623-2(2016).

10. An aluminum alloy, comprising:
from 0.01 wt. % to 5.0 wt. % Mg;
from 0.01 wt. % to 8.0 wt. % Zn;
up to 5.0 wt. % Si;
up to 1.0 wt. % Fe;
up to 0.25 wt. % impurities; and
Al; wherein the Mg and Zn are present in a ratio of from 100:1 to 10:1 of Mg to Zn by weight; wherein the aluminum alloy has a coverage percent of 18% or less during filiform corrosion testing according to ISO 4623-2(2016).

11. A coated aluminum alloy product, comprising:
an aluminum alloy substrate, a coating on a surface of the aluminum alloy substrate, the coating comprising:
from 0.3 at. % to 8.0 at. % Mg, Ca, Zn, Ni, or combinations thereof in an amount sufficient to prevent corrosion in the aluminum alloy substrate; wherein the coated aluminum alloy product has a coverage percent of 18% or less during filiform corrosion testing according to ISO 4623-2(2016); and wherein the coating on the surface of the aluminum alloy substrate is applied using a chemical wash, physical vapor deposition ("PVD"), or chemical vapor deposition ("CVD").

12. The coated aluminum alloy product of claim 11, wherein the aluminum alloy substrate is a clad layer.

13. A clad aluminum alloy product, comprising:
a core layer having a first side and a second side; and
a first clad layer in contact with the first side of the core layer, wherein the first clad layer comprises from 0.01 wt. % to 2.0 wt. % Zn, from 0.1 wt. % to 1.0 wt. % of Ca, from 0.1 wt. % to 1.0 wt. % of Mg, from 0.01 wt. % to 0.25 wt. % of Si, and Al; wherein the clad aluminum alloy product has a coverage percent of 18% or less during filiform corrosion testing according to ISO 4623-2(2016).

14. The clad aluminum alloy product of claim 13, wherein the Ca and Zn are present in the first clad layer at a ratio of from 1:5 to 1:1 of Ca to Zn by weight.

15. The clad aluminum alloy product of claim 13, wherein the first clad layer comprises from 0.20 wt. % to 0.60 wt. % Ca.

16. The clad aluminum alloy product of claim 13, wherein the first clad layer comprises from between 0.40 wt. % and 1.0 wt. % Zn.

* * * * *